United States Patent
Sarabi et al.

(10) Patent No.: US 6,839,608 B2
(45) Date of Patent: Jan. 4, 2005

(54) HYBRID MODEL AND METHOD FOR DETERMINING MECHANICAL PROPERTIES AND PROCESSING PROPERTIES OF AN INJECTION-MOLDED PART

(75) Inventors: Bahman Sarabi, Krefeld (DE); Thomas Mrziglod, Gladbach (DE); Klaus Salewski, Krefeld (DE); Roland Loosen, Erftstadt (DE); Martin Wanders, Odenthal (DE)

(73) Assignee: Bayer Aktiengesellschaft, Leverkusen (DE)

( * ) Notice: Subject to any disclaimer, the term of this patent is extended or adjusted under 35 U.S.C. 154(b) by 246 days.

(21) Appl. No.: 10/127,280

(22) Filed: Apr. 22, 2002

(65) Prior Publication Data

US 2003/0050728 A1 Mar. 13, 2003

(30) Foreign Application Priority Data

Apr. 24, 2001 (DE) ......................................... 101 19 853

(51) Int. Cl.[7] .............................................. B29C 45/00
(52) U.S. Cl. ......................................... 700/201; 700/48
(58) Field of Search .................. 400/201, 48, 202–205; 706/912, 904, 21, 23, 25, 31; 700/200

(56) References Cited

U.S. PATENT DOCUMENTS

| | | | | |
|---|---|---|---|---|
| 5,671,335 A | * | 9/1997 | Davis et al. ................... | 706/25 |
| 5,723,517 A | * | 3/1998 | Campo et al. ............... | 523/303 |
| 5,914,884 A | | 6/1999 | Gur Ali et al. ......... | 364/475.05 |
| 6,490,501 B1 | * | 12/2002 | Saunders .................... | 700/198 |
| 6,600,961 B2 | * | 7/2003 | Liang et al. ................. | 700/48 |

FOREIGN PATENT DOCUMENTS

| | | |
|---|---|---|
| DE | 195 14 535 | 10/1996 |
| DE | 197 43 600 | 4/1999 |
| WO | 98/20437 | 5/1998 |
| WO | 00/20939 | 4/2000 |

OTHER PUBLICATIONS

Neural Networks, vol. 5, (month unavailable) 1992, pp. 139–144, Frank Bärmann and Friedrich Biegler–König, On a Class of Efficient Learning Algorithms for Neural Networks.

\* cited by examiner

*Primary Examiner*—Jayprakash N. Gandhi
*Assistant Examiner*—Zoila Cabrera
(74) *Attorney, Agent, or Firm*—Joseph C. Gil; James R. Franks

(57) ABSTRACT

A method of predicting the properties (e.g., mechanical and/or processing properties) of an injection-molded article is disclosed. The method makes use of a hybrid model which includes at least one neural network. In order to forecast (or predict) properties with respect to the manufacture of a plastic molded article, a hybrid model is used in the present invention, which includes: one or more neural networks NN1, NN2, NN3, NN4, . . . , $NN_k$; and optionally one or more rigorous models R1, R2, R3, R4, . . . , which are connected to one another. The rigorous models are used to map model elements which can be described in mathematical formulae. The neural networks are used to map processes whose relationship is present only in the form of data, as it is in effect impossible to model such processes rigorously. As a result, a forecast relating to properties including the mechanical, thermal and rheological processing properties and relating to the process time of a plastic molded article is obtained.

22 Claims, 24 Drawing Sheets

$$\varepsilon_0 = \frac{\sigma}{E}$$

$$\varepsilon_{app}(t) = \varepsilon_0 + m(t/t_0)^n$$

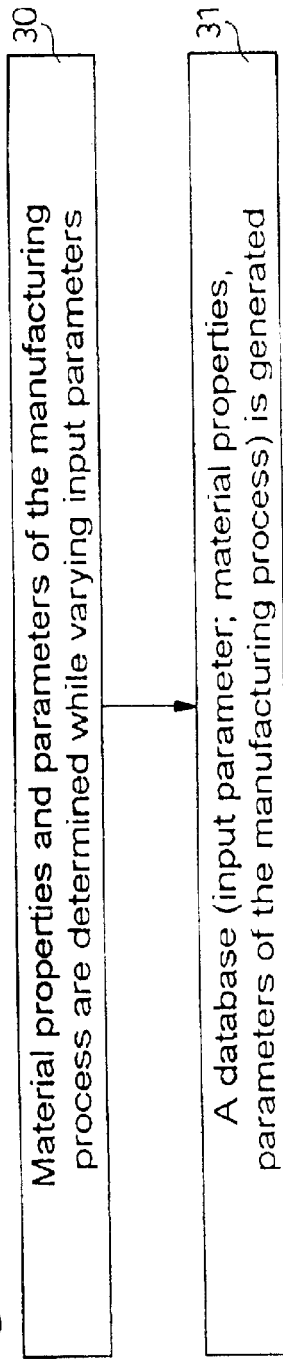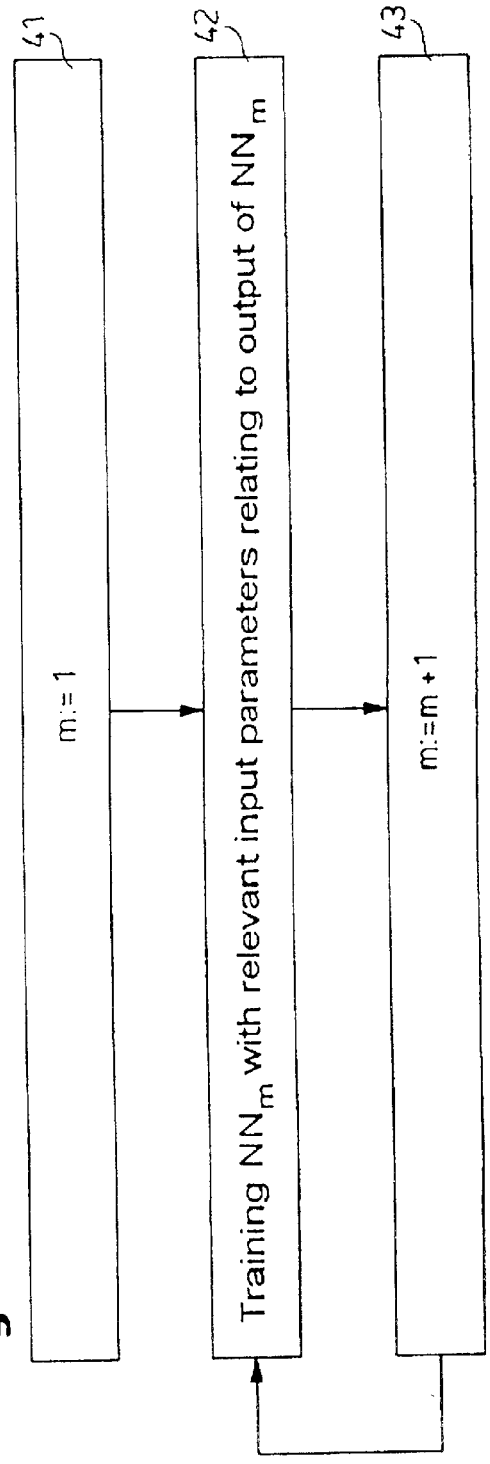

HYBRID MODEL AND METHOD FOR DETERMINING MECHANICAL PROPERTIES AND PROCESSING PROPERTIES OF AN INJECTION-MOLDED PART

CROSS REFERENCE TO RELATED PATENT APPLICATION

The present patent application claims the right of priority under 35 U.S.C. §119 (a)–(d) of German Patent Application No. 101 19 853.1, filed Apr. 24, 2001.

FIELD OF THE INVENTION

The invention relates to a neural network and a method for determining properties relating to the manufacture of an injection-molded part.

BACKGROUND OF THE INVENTION

U.S. Pat. No. 5,914,884 discloses a method for evaluating the properties of a plastic material in a plastic injection-molding method. An empirical model is used to describe the relationship between process variables and a multiplicity of quality characteristics. The empirical model is produced with reference to empirical data determined by means of a plastic injection-molding process. One of the disadvantages of this method is the practical difficulties and the necessary expenditure involved in the generation of the empirical model.

SUMMARY OF THE INVENTION

The invention is therefore based on the object of providing an improved method, with a neural network, for determining one or more properties relating to the manufacture of an injection-molded part.

In accordance with the present invention, there is provided a method of determining at least one of mechanical properties and processing properties of an injection-molded part comprising:

(a) providing a hybrid model comprising,
  (i) a first database (12) for storing a relationship between commercial injection molded products and the respective components of the commercial products,
  (ii) a means (1) for inputting recipe parameters of commercial products which specify the composition of the injection-molded part,
  (iii) a means for accessing the first database for the purpose of determining component parameters from the recipe parameters, and
  (iv) at least one neural network for inputting at least one component parameter and for outputting a forecast value;
(b) selecting recipe parameters and component parameters;
(c) inputting recipe and component parameters into said hybrid model; and
(d) obtaining at least one of a forecast and a calculated value of at least one property of said injection-molded part.

The features that characterize the present invention are pointed out with particularity in the claims, which are annexed to and form a part of this disclosure. These and other features of the invention, its operating advantages and the specific objects obtained by its use will be more fully understood from the following detailed description and the accompanying drawings in which preferred embodiments of the invention are illustrated and described.

Other than in the examples, or where otherwise indicated, all numbers or expressions, such a those expressing structural dimensions, etc, used in the specification and claims are to be under stood as modified in all instances by the term "about."

BRIEF DESCRIPTION OF THE DRAWING FIGURES

FIG. 29 is a representative flowchart of the steps for generating a database for training the neural network; and FIG. 30 is a representative flowchart of the training of the neural networks contained in the hybrid neural network.

In FIGS. 1–30, like reference numerals designate the same components and structural features.

DETAILED DESCRIPTION OF THE INVENTION

Figure 1:
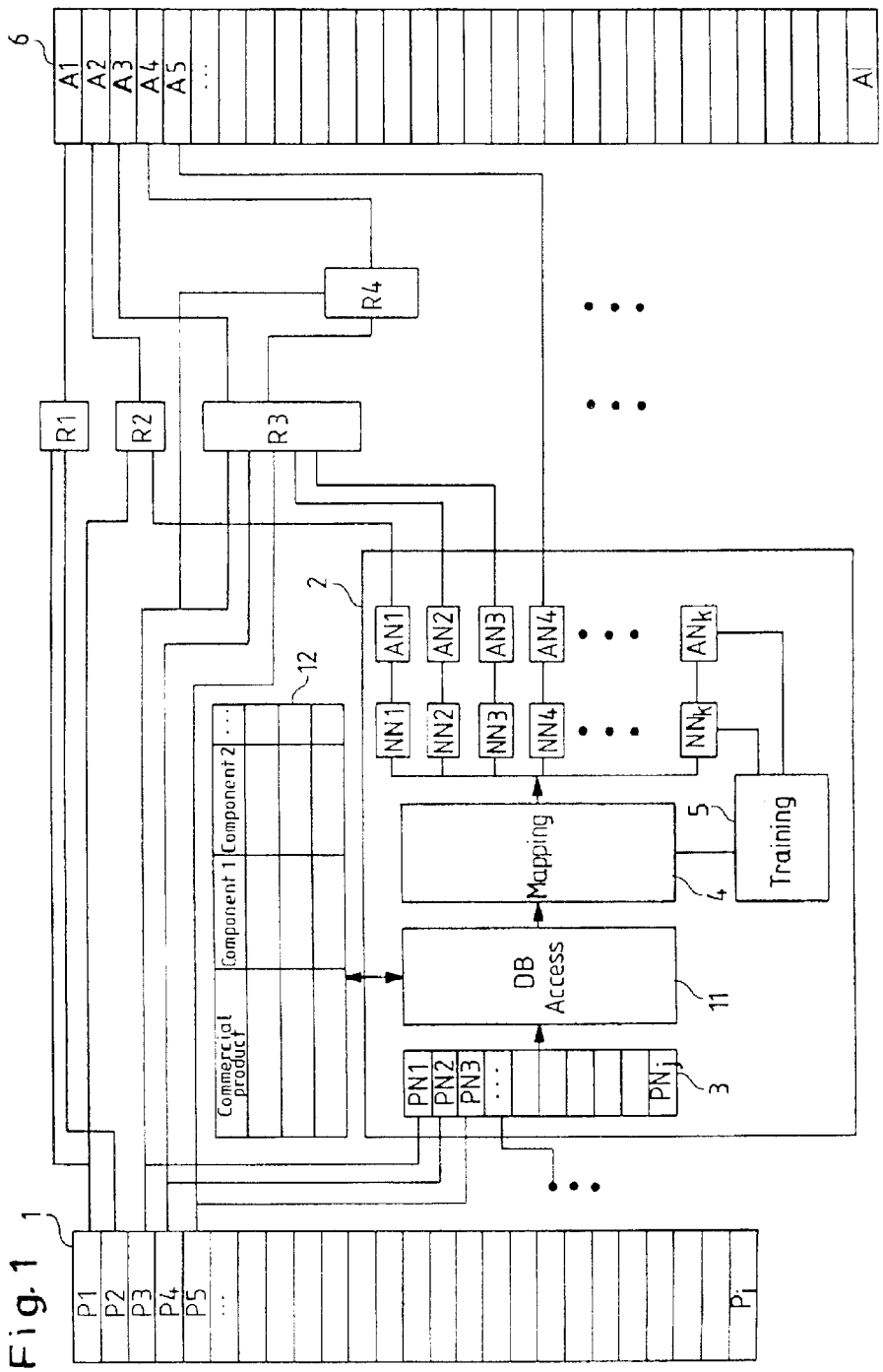
FIG. 1 is a representative schematic illustration of an embodiment of the hybrid model according to the invention.

The invention permits various properties relating to the manufacture of an injection-molded part to be forecast, specifically both with respect to the injection-molding method and with respect to the properties of the resulting injection-molded part.

In particular, the forecasting of process times and processing properties during injection-molding of plastic molded parts is of great practical significance because the manufacturing costs of injection-molded parts are decisively influenced by the productivity of the injection-molding fabrication. The characteristic parameter here is the process time of the injection-molding machine for manufacturing a molded part.

To calculate the process time requires not only the material-specific properties to be characterized by the raw material manufacturer but also the customer-specific application (geometry, mold) to be taken into account. The corresponding process times thus result from the interaction of material properties, the process parameters of the injection-molding machine and the construction of the injection mold.

These complex relationships can be mapped using neural networks. The neural networks are supplemented by rigorous computational models which are connected to the neural network. For example, in such a rigorous computational model it is possible to calculate the plastification capacity taking into account the screw geometry of the injection-molding machine used.

The comprehensive modelling of the injection-molding process permits, over and beyond the forecasting of a process time, a large amount of information to be obtained on important quality features of the injection-molded part. By taking into account the process control, it is possible, for example, to forecast the dimensional accuracy of the molded parts, the modules of elasticity, the fracture stresses and elongations as a function of the direction of flow and wall thickness, the resistance to deformation under heat and further material properties.

A further advantage of the invention is that these forecasts relating to the injection-molding process and the expected properties of the molded parts can be carried out by the user without special knowledge. It is a particular advantage here that the invention can be used for planning and designing new injection-molding applications. The hybrid neural network according to the invention makes it possible to test the feasibility of a new project, even in an extremely early planning phase, by means of a computer simulation which is easy to carry out. This is in particular of great significance for the reduction of what is referred to as the "time to market" phase.

Furthermore, the invention for computationally configuring parts permits the design engineer to make available suitable material characteristic values by forecasting using the hybrid model according to the invention. Owing to the complex material characteristics of plastics, such material characteristic values may be indispensable for such configuration of parts. The invention makes it possible to determine such material characteristic values without carrying out test series or the like.

In addition, the invention also makes possible a forecast with respect to the machine and process parameters of the plastic injection-molding machine which are necessary for a desired molded part. It is thus possible to test in advance whether it is at all possible to manufacture a specific part on an existing injection-molding machine.

An embodiment of the invention will be explained in more detail below with reference to the drawings.

The hybrid neural network in FIG. 1 has an input 1 for inputting parameters P1, P2, P3 . . . $P_i$. These parameters can be material parameters or recipe parameters, for example for specifying commercial products made up of composite recipes, and/or process and machine parameters relating to the injection-molding process or the injection-molding machine, and/or design parameters and molded-part parameters, for example relating to the wall thickness of the molded part and of the flow length.

In the embodiment under consideration here, the input 1 is used to input, inter alia, the following parameters:

| Molded part parameters | Recipe | Process parameters | Machine parameters |
| --- | --- | --- | --- |
| Test specimen thickness, Molded part volumes, Customer-specific flow length | Pocan, fibre glass, macrolon, citric acid, paraloid, talcum | Stock temperature, mold temperature, holding pressure | Shear rate, injection rate, screw diameter, pitch of metering zone, flight depth of the screw of the metering zone, channel width of the metering zone, length of the metering zone, back pressure, speed of screws |

In addition, the hybrid model has a neural network module 2. The neural network module 2 has an input 3 for inputting parameters PN1, PN2, PN3 . . . $PN_j$. The input 3 is connected to the input 1 so that some of the parameters P1 to $P_i$ of the input 1 are also entered into the input 3 of the neural network module 2.

By virtue of a corresponding connection between the input 3 and the input 1, the input parameter PN1 of the neural network module 2 is therefore identical to the parameter P3 of the input 1 of the hybrid model. The parameters PN2 and P4, and PN3 and P5, are also identical in the example shown.

The parameters PN1 to $PN_j$ therefore form a subset of the parameters P1 to $P_i$. The further corresponding connections between the input 1 and the input 3 are not shown in detail in FIG. 1 for the sake of clarity.

The input 3 of the neural network module 2 is connected to a mapping module 4. The mapping module 4 is itself connected to the neural networks NN1, NN2, NN3, NN4, ... $NN_k$. Each of the neural networks NN1 to $NN_k$ has a corresponding output AN1 to $AN_k$.

Each of the neural networks NN1 to $NN_k$ is trained for forecasting a specific property which is output via the corresponding output if the necessary input parameters are applied to the input of the respective neural network. The number of necessary input parameters may vary here.

In order to apply the input parameters necessary for a specific neural network to the input of this network, the mapping module 4 carries out corresponding transformations of the parameter vector of input 3 which is composed of the parameters PN1 to $PN_j$. If, for example, the neural network NN1 requires only the input parameters PN1, PN2 and PN3, but not the further parameters PN4 to $PN_j$, the mapping module 4 ensures that only the parameters PN1 to PN3 are present at the input of the neural network NN1. The same applies to the further neural networks. The mapping can be carried out by multiplying the parameter vector of the input 3 in each case by a specific matrix adapted to the respective neural network.

The neural network module 2 also has a training module 5 which is active in a training mode of the neural network module 2. The training module 5 is respectively connected to the mapping module 4 and to the neural networks NN1 to $NN_k$ as well as to their corresponding outputs. The training of the individual neural networks can be carried out sequentially here, that is to say the individual neural networks are trained in a known fashion independently of one another by applying different input parameters under the supervision of the training module 5.

What is referred to as the back-propagation method or the "NN-Tool 2000" program, for example, which is commercially available from Professor Frank Bärmann, Fachhochschule Gelsenkirchen, Fachbereich physikalische Technik [Technical University of Gelsenkirchen, Department of Physical Technology] is suitable for this purpose. The corresponding training method is also described in the publication "Neural Network", volume 5, pages 139 to 144, 1992, "On a class of efficient learning algorithms for neural networks", Frank Bärmann, Friedrich Biegler-König.

There may be a further module 11 between the input 3 and the mapping module 4. The module 11 is used to access a database 12. The database 12 contains, for each commercial product, the components (component 1, component 2, ...) from which the corresponding commercial product is composed, as well as the corresponding percentages or mixture ratios.

Recipe parameters, for example names of commercial products, are entered at the input 3. With a commercial product as key, the module 11 then accesses the database 12 in order to determine the corresponding components and their recipe proportions. The components determined in this way are then used, together with the further parameters of the input 3 which do not relate to the recipe, as inputs for the mapping module 4.

The hybrid neural network also has a number of rigorous models R1, R2, R3, R4, . . . . The rigorous models are model elements which can be represented by means of mathematical formulae. Those parts of the model for which mathematical formulae cannot be specified are dealt with by means of the neural network module 2. The rigorous models can be connected to one another and to the neural network module.

In the embodiment shown, the rigorous model R1 is connected only to the input 1, but not to other rigorous models or to an output of the neural network module 2. The output of the rigorous model R1 is connected to the output A1 of the output 6.

The rigorous model R2 is, on the other hand, connected to the parameter P1 of the input 1 and to the output AN1 of the neural network module 2. The output of the rigorous model R2 is connected to the output A2.

The rigorous model R3 is connected to the parameters P3, P4 and P5 of the input 1 and to the outputs AN2 and AN3 of the neural network module 2. The output of the rigorous model R3 is connected both to the output A3 and to the input of the rigorous model R4. The rigorous model R4 has a further input which is connected to the parameter P3. The output of the rigorous model R4 is connected to the output A4.

In the embodiment described herein, the parameters PN1 to $PN_j$ of the input 3 can be the recipe, thickness, stock temperature, mold temperature, shear rate and holding pressure.

The output variables which are present at the outputs AN1 to $AN_k$ can correspondingly be the density, sealing period, sealing temperature, deformation temperature, standard filling pressure, zero viscosity, reciprocal transitional shear rate, Carreau increase and mechanical properties.

The mass of the molded part, the mold filling time, the effective thermal diffusivity, the cooling time, the filling pressure, the metering time, the process time and further mechanical properties, for example, can then be determined computationally using the rigorous models.

The following values are then correspondingly available at the output 6, for example:

| Processing properties | Mechanical properties | Thermal properties | Forecast of process time | Rheological properties |
|---|---|---|---|---|
| Filling pressure, Plastifying capacity, static friction, sliding friction, | Modulus of elasticity (longitudinal, transverse), yield stress, yield | Deformation temperature, density, non-flow | Sealing period, processing time, mold | Melt viscosity, Carreau parameters, |

-continued

| Processing properties | Mechanical properties | Thermal properties | Forecast of process time | Rheological properties |
|---|---|---|---|---|
| shrinkage | elongation, tearing yield (longitudinal, transverse), breaking strain (longitudinal, transverse), work to yield stress, work to breakage, nominal breaking strain, bending modulus, bending stress, peripheral fibre strain, resistance to breaking | temperature, mass of molded part | filling time (injection time), metering time, cooling time | Carreau melt viscosity |

Figure 2:
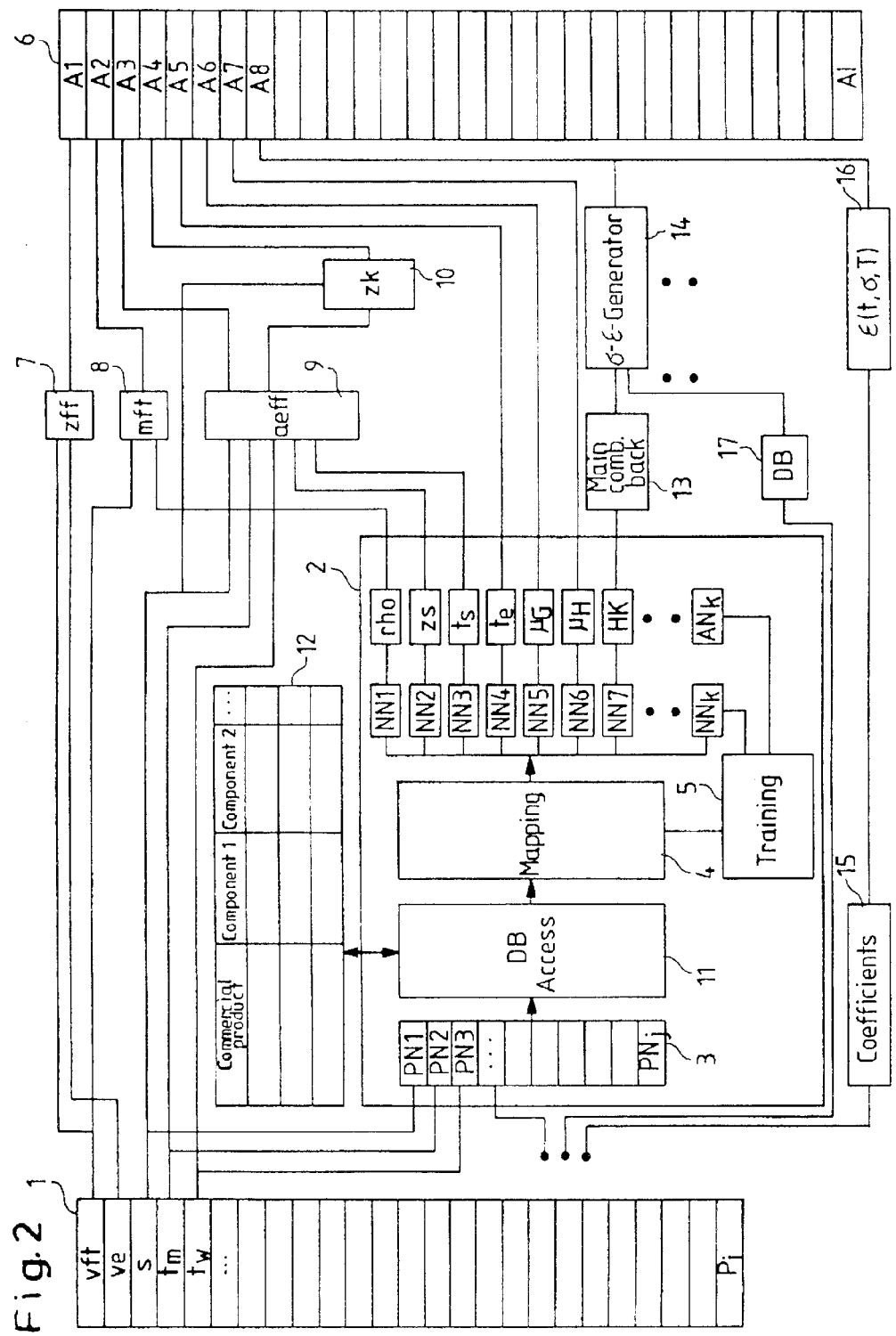
FIG. 2 is a representative schematic illustration of an application of the hybrid model of FIG. 1.

FIG. 2 shows an application case of the hybrid neural network in FIG. 1. The following parameters P1 to P5 are shown by way of example at the input 1:

vft=volume of molded part
ve=injection speed
s=thickness
$t_m$=mass, temperature
$t_w$=mold temperature The further input parameters of the input 1 are not illustrated in FIG. 2 for the sake of simplicity.

The parameters vft and ve are input into the rigorous model 7 in order to calculate the mold filling time. For this purpose, the following formula:

$$zff = \left(\frac{vft}{0.85}\right) \cdot \frac{4}{(ve \cdot s^2 \cdot \pi)}$$

is stored in the rigorous model 7. The mold filling time zff calculated with the rigorous model 7 is output via the output A1.

The following formula:

$$mft = vft \cdot rho$$

is stored in the rigorous model 8 in order to calculate the mass of the molded part.

Correspondingly, the inputs of the rigorous model 8 are combined with the parameter vft of the input 1 or with the output of the neural network NN1. The output of the neural network NN1 supplies the density rho. The rigorous model 8 then calculates the mass mft of the molded part from the input parameter vft or the forecast value rho, and the mass mft of the molded part is then output via the output A2.

The rigorous model 9 is used to calculate the effective thermal diffusivity aeff. In order to calculate the effective thermal diffusivity, the following formula:

$$aeff = \frac{s^2}{\pi^2 \cdot zs} \cdot \log\left(\frac{4}{\pi} \cdot \frac{t_m - t_w}{t_s - t_w}\right)$$

is stored in the rigorous model 9.

The input of the rigorous model 9 is correspondingly connected to the corresponding parameters s, $t_m$ and $t_w$ of the input 1. In addition, the input of the rigorous model 9 is also connected to the outputs of the neural networks NN2 and NN3 which supply the sealing period zs and the sealing temperature $t_s$ as forecast values. The effective thermal diffusivity aeff which is determined in this way is output via the output A3 of the rigorous model 9.

In addition, the effective thermal diffusivity aeff is also fed from the output of the rigorous model 9 to an input of the rigorous model 10. The rigorous model 10 is used to calculate the cooling time zk. The following formula:

$$zk = \frac{s^2}{\pi^2 \cdot aeff} \cdot \log\left(\frac{4}{\pi} \cdot \frac{t_m - t_w}{t_e - t_w}\right)$$

is stored in the rigorous model 10 in order to calculate the cooling time.

The rigorous model 10 correspondingly has a further input which is connected to the parameter s of the input 1, and further inputs which are not shown in FIG. 2 for the sake of clarity and which are connected to the input parameters $t_m$ and $t_w$ and to the forecast value $t_e$ of the output of the neural network NN4. The cooling time zk which is determined on the basis of this input parameter and/or on the basis of the forecast value and the effective thermal diffusivity is output by the rigorous model 10 via the output A4.

The hybrid neural model can contain further rigorous models, for example for calculating the filling pressure for the customer's application, the calculation of the metering time, the processing time and the transformation of specific mechanical properties. These further rigorous model elements are not illustrated in FIG. 2 for the sake of clarity. Corresponding calculation specifications for implementing such further rigorous model elements can be found, for example, in the publications Anwendungstechnische Information [Technical Application Information] 1104, "optimierte Werkzeugtemperierung [Optimized Mold Temperature Control]", Olaf Zöllner, Bayer AG, Geschäftsbereich Kunststoffe [Plastics Division] and Schwarzel, F. R., Polymer Mechanik [Polymer Mechanics], Springer Verlag [Publishing House] Berlin Heidelberg 1990, page 362.

Figure 3:
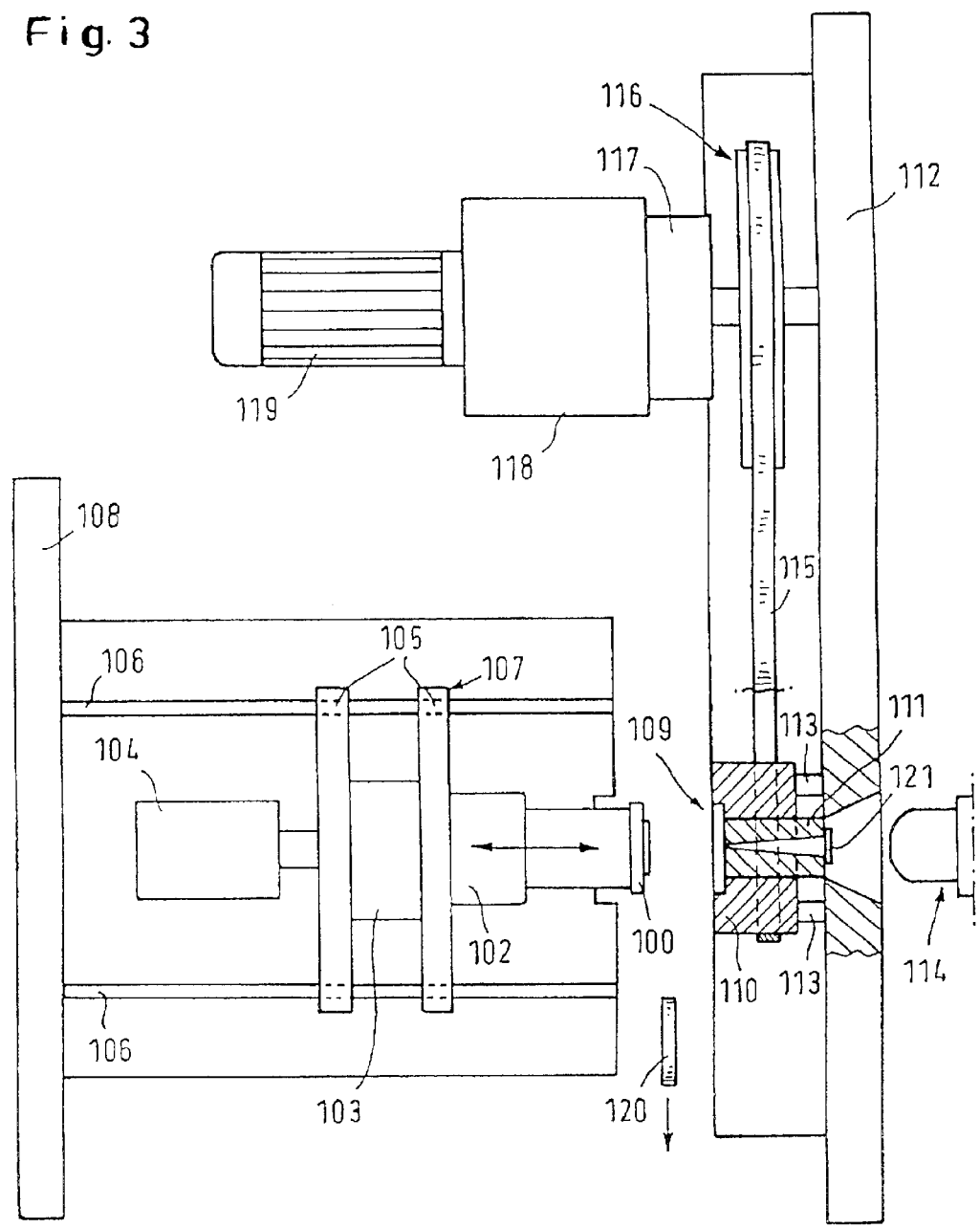
FIG. 3 is a representative illustration of a device for determining coefficients of friction.

The hybrid model in FIG. 2 also has a neural network NN5 for forecasting a coefficient $\mu_G$ of sliding friction and a neural network NN6 for forecasting a coefficient $\mu_H$ of static friction. The neural networks NN5 and NN6 are trained using the recipe parameters or the corresponding components determined by means of the module 11, on the one hand, and the resulting friction parameters on the other hand. The values necessary for this training are determined as follows:

FIG. 3 shows a device for determining coefficients of static friction and sliding friction. The device includes a mold die 100 which is connected to a torque sensor 102. A normal force sensor 103 is arranged behind the torque sensor 102. A force can be exerted on the mold die 101 by means of a pneumatic cylinder 104.

The arrangement composed of the mold die 101, the torque sensor 102, the normal force sensor 103 and the pneumatic cylinder 104 is secured by means of axially mounted guides 105. The corresponding guide struts 106 are used to guide the guides 105 and to absorb a torque transmitted to the torque sensor 102 by the mold die 101. It is necessary for this torque to be completely absorbed by the guide struts if the normal force sensor 103 must not be subjected to any radial forces.

The guide struts 106 are attached to a clamping plate 108. A high pressure can then be exerted on the mold die 101 for the plastic injection-molding process, by means of a hydraulic system (not illustrated in FIG. 3).

The device also includes a molding nest 109 which, together with the mold die 101, forms a plastic injection mold. The molding nest 109 includes a driver 110 and a sprue bush 111. The driver 110 and the sprue bush 111 can move relative to one another in the longitudinal direction; for this purpose, a ball bearing or sliding bearing may be arranged between the driver 110 and the sprue bush 111. Elastic elements 113, for example plate springs, are located between the driver 110 and a clamping plate 112.

Liquid plastic can be introduced into the closed plastic injection mold via the sprue bush 111 by means of a plastifying unit 114.

The driver 110 is designed to receive a toothed belt 115 which is connected to an electric motor 119 by means of a crown gear 116 via a clutch 117 and a gearbox 118.

A measurement of a coefficient of static friction and/or sliding friction is carried out as follows: first, the injection mold is closed, i.e. the mold die 101 is moved into its molding nest 109. The elastic elements 113 are compressed between the driver 110 and the clamping plate 112 in the process. Liquid plastic is injected into the injection mold by the plastifying unit 114 via the sprue bush 111, during which process—as is generally customary in plastic injection machines—high pressures are applied by means of the hydraulics (not shown in FIG. 3).

As a result of the injection of the liquid plastic into the injection mold, a test specimen made of the plastic material to be investigated is formed there. The actual determination of the coefficients of static friction and/or sliding friction can be carried out after a necessary cooling time has passed, i.e. after the plastic has solidified in the injection mold.

For this purpose, the mold die 101 is first moved back a small distance, for example 2 mm. The driver 110 is entrained by this movement of the mold die 101 owing to the force of the elastic elements 113 which acts in the direction of movement of the mold die. During this movement of the plastic injection mold, the positive locking between the mold die 101 and the molding nest 109 is maintained at all times so that the contact between the test specimen 120 and the mold die 101 remains as when fresh from molding.

During the movement of the driver 110 in the longitudinal direction, the sprue bush 111 remains fixed so that the sprue 121 which is produced during the plastic injection-molding process is torn off the test specimen 120 located in the injection mold. The separation of the sprue 121 from the test specimen 120 before the measurements are carried out is advantageous in order to avoid falsification of the measurement result by the sprue 121.

In order to carry out the measurement of the coefficients of static friction and/or sliding friction of the test specimen 120 in the plastic injection mold, a normal force is first applied to the mold die 101 in order to press the mold die 101 against the test specimen 120. The normal force applied by the pneumatic cylinder 104 in this case can be in a range between 0 and 10 bar, preferably 5 to 10 bar. After the application of normal force, the electric motor 119 is switched on in order to transmit a torque to the test specimen 120 via the gearbox 118, the clutch 117, the crown gear 116 and the toothed belt 115 and via the driver 110. In order to reliably transmit this torque to the test specimen 120, said test specimen 120 is preferably located in a positively locking arrangement with the part of the cavity of the injection mold which is formed by the driver 110. The gearbox 118 preferably has a transmission ratio of 1 to 200 in order to make the necessary torque available.

As a result of this torque, the test specimen 120 undergoes a defined rotary movement of, for example, 37° around the centre axis. During this rotary movement, the torque acting on the test specimen 120 is transmitted entirely or partially to the mold die 101. The torque which is being transmitted is measured and registered by the torque sensor. For this purpose, the torque sensor 102 can be connected to what is referred to as a data logger in order to register the variation over time of the torque transmitted to the mold die 101 by the test specimen 120. During the rotation of the test specimen 120, there is a transition from static friction to sliding friction which results in a characteristic variation in the torque over time, which is measured by the torque sensor 102.

Figure 4:
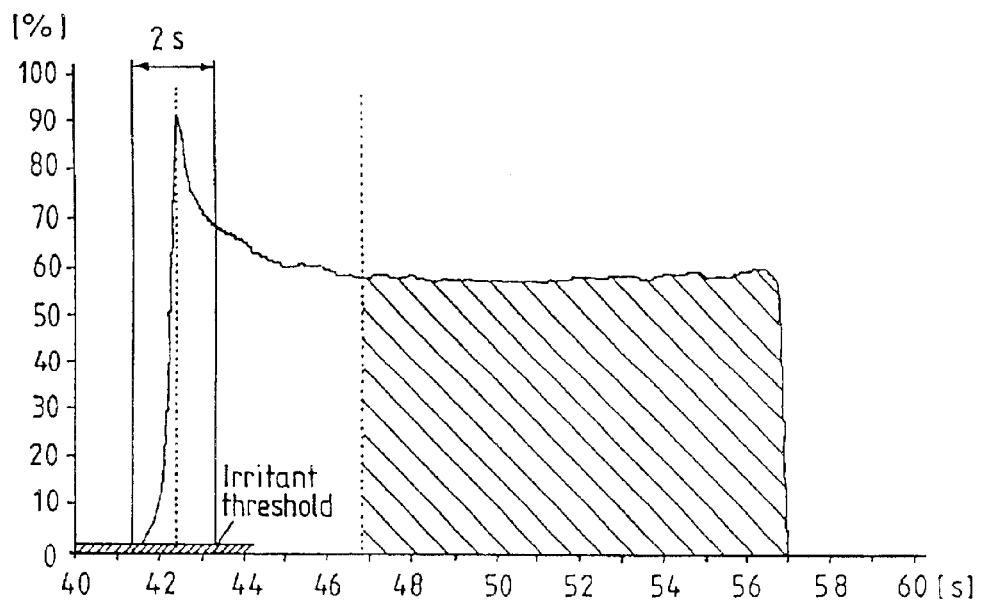
FIG. 4 is a graphic illustration of the variation of torque over time measured with the device of FIG. 3.

FIG. 4 shows a characteristic torque profile which is determined by the torque sensor 102 when a measurement is carried out on the test specimen 120 (see FIG. 3). The measurement curve in FIG. 4 shows the variation of the torque measured by the torque sensor 102 as a percentage of the maximum torque plotted against the time axis. After what is referred to as the irritant threshold has been reached, the torque curve first rises steeply because the mold die 101 and the test specimen 120 are initially still in the region of static friction. The torque curve reaches a marked maximum—at approximately 90% in the example shown—approximately one second after the irritant threshold is exceeded. The maximum torque which is determined in this way and the normal force applied to the mold die 101 via the pneumatic cylinder 104 and the average radius r of the test specimen 120 are included in the calculation of the coefficient of static friction.

After the maximum torque has been reached, the torque curve drops away and then reaches the region of sliding friction shown by hatching. In the region of sliding friction, the torque which is being transmitted is at approximately 60%. Correspondingly, the coefficient of sliding friction is determined from the torque transmitted in the case of sliding friction, together with the normal force and the average radius r of the test specimen 120. After the measurement has been carried out, the injection mold is opened, i.e. the mold die 101 is moved back, and the test specimen 120 is ejected from the molding nest 109—as shown in FIG. 3. The plastic injection mold is then closed again in order to manufacture a further test specimen 120 for carrying out a further measurement. The same measurement is advantageously carried out approximately four to five times in succession with the same peripheral conditions and using the same plastic material. The respectively determined coefficients of static friction and sliding friction are then averaged in order to increase further the accuracy of the measurement result. This can be done automatically using an appropriate evaluation program of the data logger.

Figure 5:
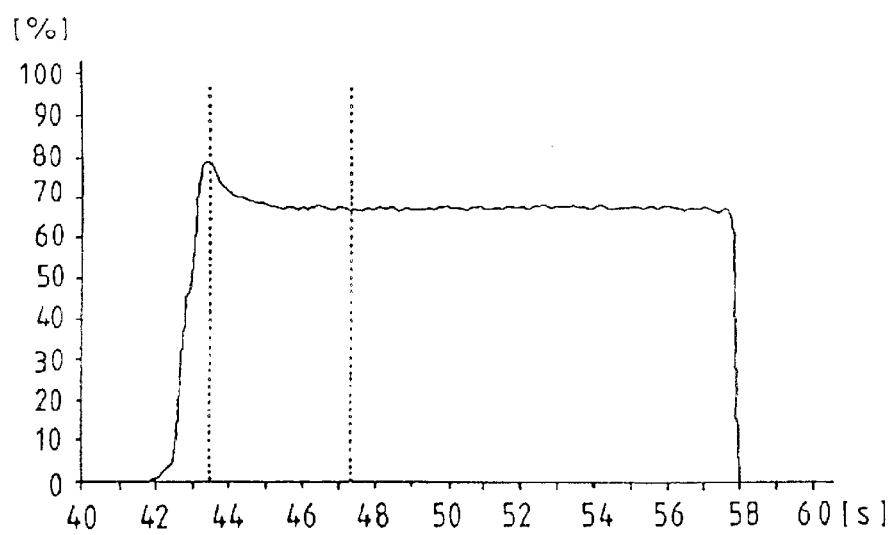
FIG. 5 is a graphic illustration of a corresponding torque profile for a specific mold temperature.

FIG. 5 shows a measuring example corresponding to the diagram in FIG. 4, which has been injection-molded for a test specimen made of polycarbonate (Macrolon 2800) under the following conditions in a device in accordance with FIG. 3:

Stock temperature: 300°
Mold temperature: 90°
Injection speed: 40 mm/sec
Holding pressure: 600 bar The injection-molded test specimen is a 3 mm-thick round plate which has been centrally coated with an indented edge with a diameter of 95 mm.

The time when the holding pressure phase ends is determined by measuring the internal pressure of the mold using a pressure sensor in the injection mold. After the termination of the holding pressure phase, the mold die 101 was pressed against the test specimen 120 with a normal force of 3200 newtons by means of the pneumatic cylinder 104 (see FIG. 3). The normal force was set here with a measuring range of 0 to 10 kilonewtons using the normal force sensor.

After the termination of the plastifying phase, the nozzle of the plastifying unit 114 was moved away from the mold. The injection mold was then opened 5 mm, the sprue 121 being torn off by the driver 110 which is pressed out of its seat. The driver and the test specimen 120 which is located in it were then turned through an angle of 37° with a speed of 0.5 mm/sec (with respect to the central radius of the test specimen) using the drive unit of the electric motor 119. The torque values which were transmitted to the mold die 101 in the process were measured by the torque sensor 102 (measuring range 0 to 200 newton meters) integrated into the measuring device, using strain gauges in accordance with the principle of resistance measurement, and registered. The data obtained in this way was transmitted to the data logger which recorded the variation of the torque values in FIG. 5 over time. A coefficient of static friction of 0.515 is obtained from the maximum value of the torque curve, and a coefficient of sliding friction of 0.439 is obtained from the chronologically constant final values of the torque in the sliding friction range.

Figure 6:
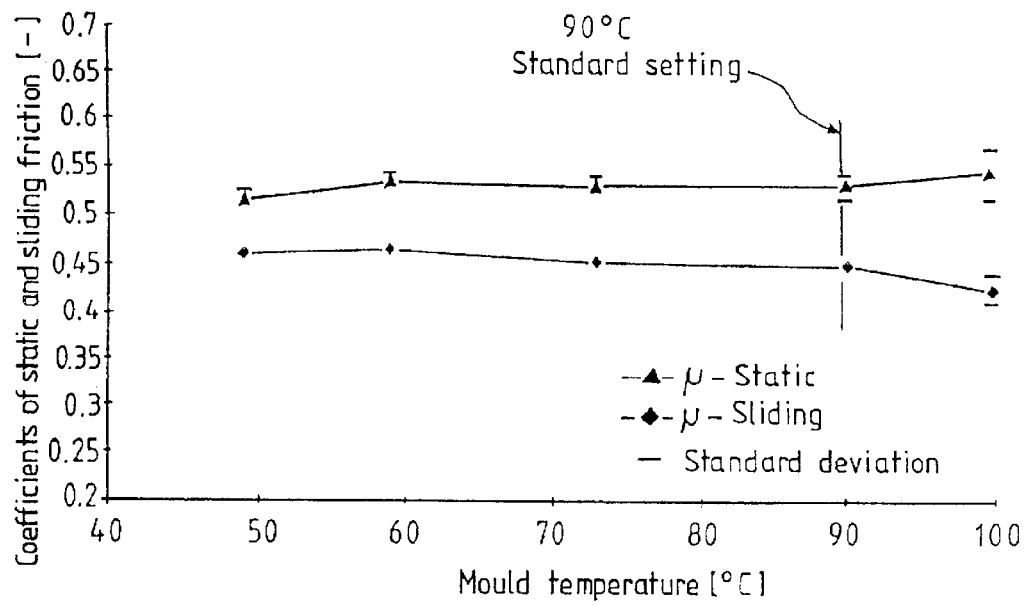
FIG. 6 is a graphic illustration of the variation of the measured coefficients of static friction and sliding friction as a function of the mold temperature.

FIG. 6 shows the coefficients of static friction and sliding friction which can be determined using the measuring arrangement in FIG. 3 as a function of the mold temperature of the plastic injection mold. The upper curve in FIG. 6 indicates the measured coefficients of static friction here, and the lower curve indicates the measured coefficients of sliding friction. The torque temperature was varied in a wide range between 50° and 100°. From the curve profile in FIG. 6 it is apparent that both the coefficients of static friction and of sliding friction can be determined largely independently of the mold temperature in the device in FIG. 3.

Figure 7:
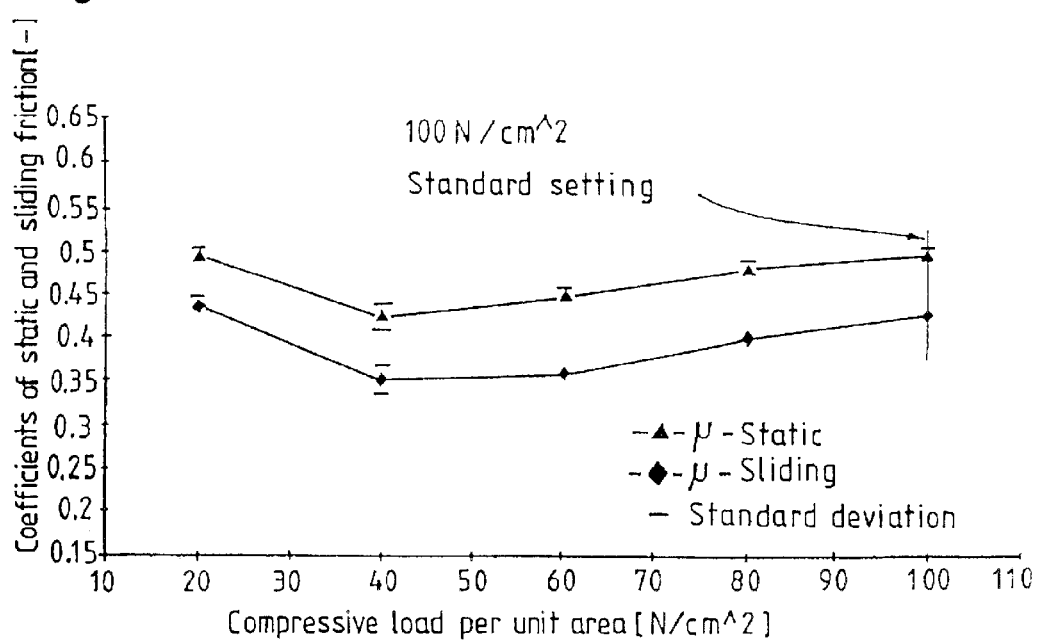
FIG. 7 is a graphic illustration of the variation of the coefficients of static friction and sliding friction determined with the device of FIG. 3 as a function of the compressive load per unit area.

FIG. 7 shows the results of measurements carried out with the device in FIG. 3 with different compressive loads per unit area. The upper curve profile in FIG. 7 gives the coefficients of static friction determined and the lower curve profile gives in turn the coefficients of sliding friction. For this purpose, different normal forces were applied to the test specimen 120 by means of the pneumatic cylinder 104 so that the different compressive loads per unit area were produced.

From the curve profiles in FIG. 7 it is apparent that the determination of the coefficients of friction in the device in FIG. 3 is influenced only to a small degree by the level of the compressive load per unit area.

Figure 8:
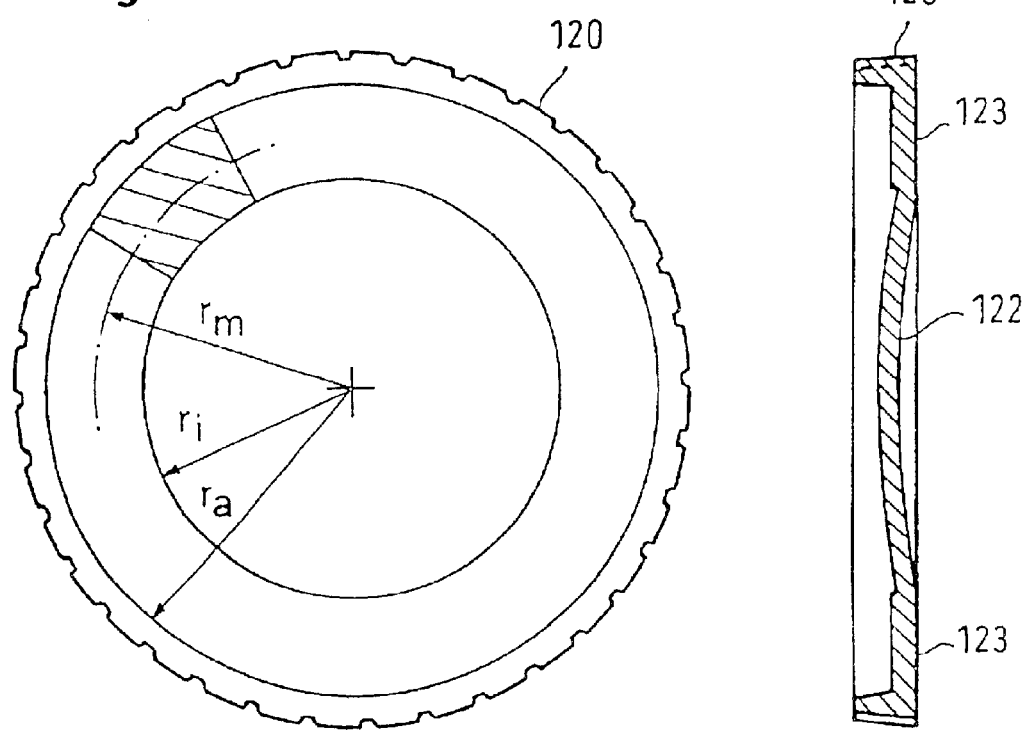
FIG. 8 is a representative sectional view of a test specimen that can be produced with the device of FIG. 3.

FIG. 8 shows an enlarged plan view and sectional view of the test specimen 120. The test specimen 120 has, at its outer circumference, an indented surface in order to ensure reliable positive locking with the driver 110 in order to transmit the torque. In its central region, the test specimen 120 has a bulge 122. The bulge 122 is used to increase the elasticity of the test specimen in order to prevent deformations during a shrinkage process when the test specimen cools. This ensures that in its planar regions 123 the test specimen 120 rests flat against the surface of the mold die 101. The region 123 has an inner radius r, index i, and an outer radius r, index a, resulting in an average radius r, index m, which is used for the calculation of the coefficients of friction. For example, the test specimen 120 can have a diameter of 95 mm, an inner radius ri of 28 mm and an outer radius ra of 42 mm.

The invention therefore permits the coefficients of static friction and sliding friction to be determined in a precise and generally valid way in order to determine precisely the necessary "breaking loose force" of a molded part from the injection mold. This constitutes a very significant process step over the demolding method known from the prior art, which does not supply any generally valid demolding forces, but only such forces which are characteristic for the respective mold temperatures, cooling times and holding pressures.

The hybrid model in FIG. 2 also has a neural network NN7 for forecasting main components of the characteristic points of a stress-strain curve. The forecast values are input into a rigorous model 13 for inverse transformation of the main components. The inversely transformed main components are then input into a strain-stress curve generator 14 in order to determine a stress-strain curve from the inversely transformed main components. The stress-strain curve generator 14 determines a stress-strain curve from the input values by means of corresponding calculation methods.

Figure 9:
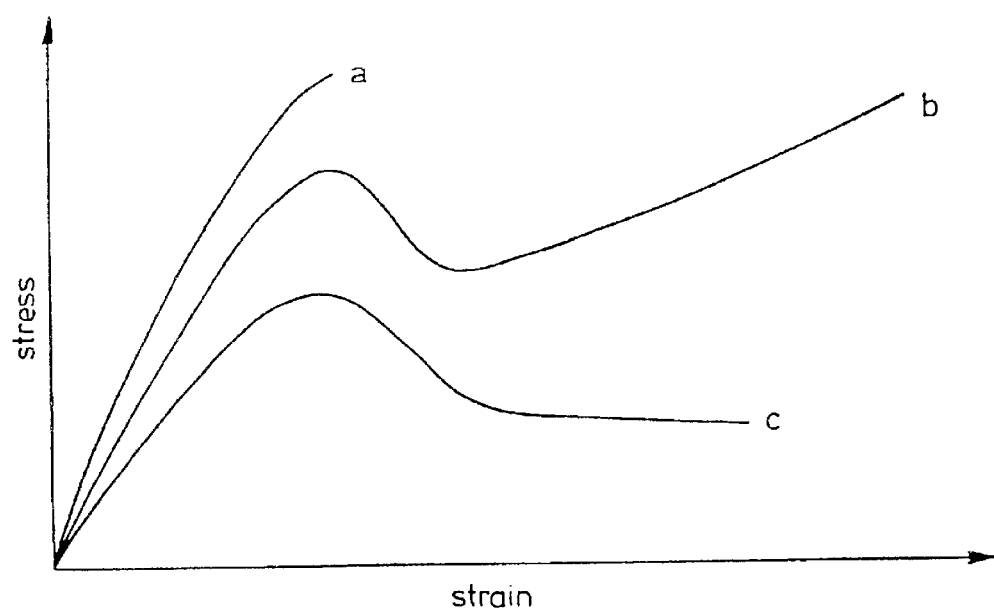
FIG. 9 is a graphical representation of a known method of standardizing stress-strain curves which is known from the prior art.

The method for manufacturing the neural network NN7 and the method of operation of the stress-strain curve generator 14 will be explained in more detail below:

FIG. 9 shows by way of example various standardized stress-strain curve profiles. The curve a occurs with tough or brittle materials without a yield point, said curve having a relatively flat profile with tough materials and rising steeply with brittle materials. The curve b occurs with tough materials with a yield point. The tensile strength and fracture stress are greater here than the yield stress. The curve c also occurs with tough materials with a yield point. The tensile strength is at the yield point and is greater than the fracture stress.

Figure 10:
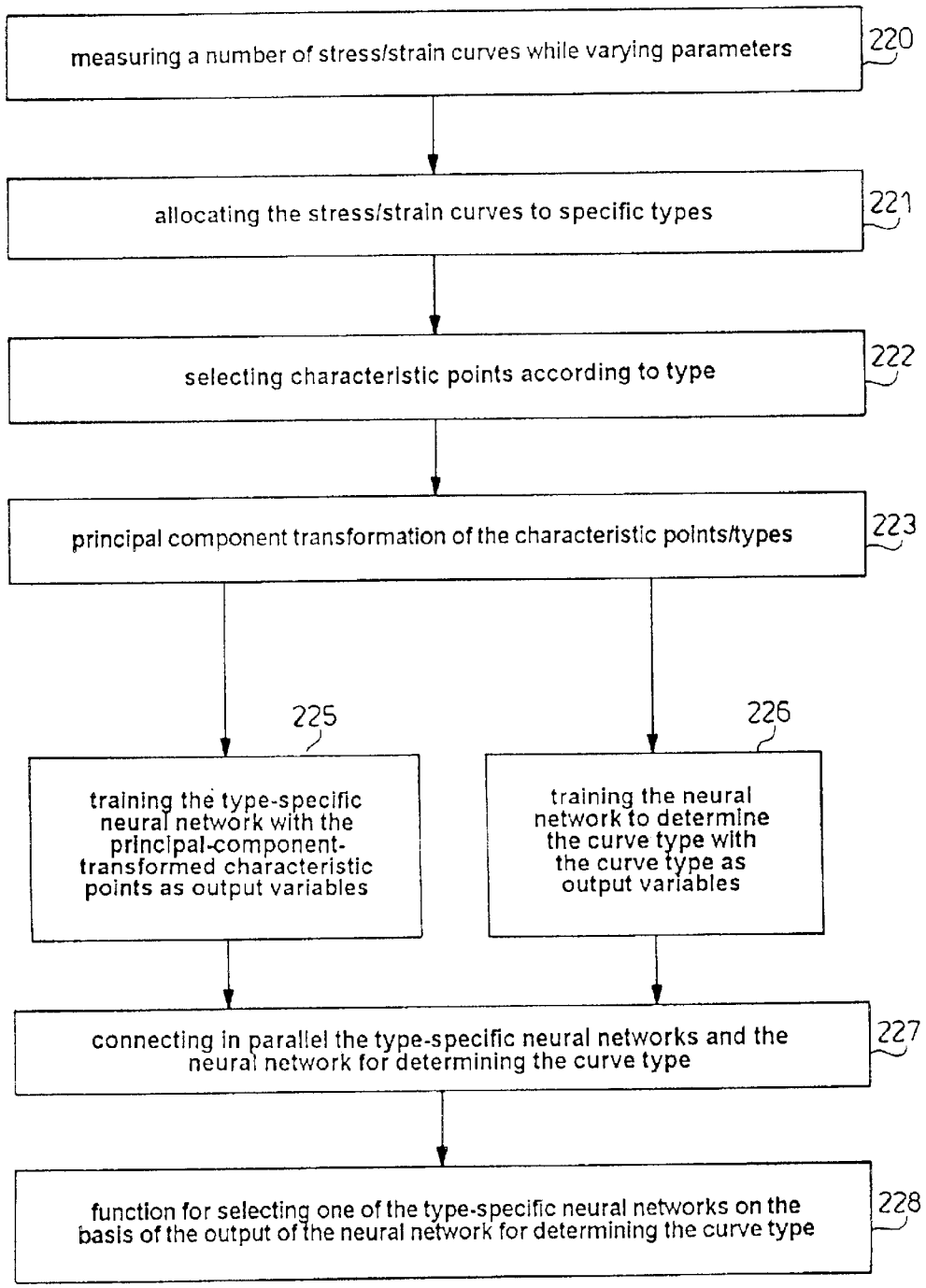
FIG. 10 is a representative flowchart of an embodiment of the method according to the invention for producing a neural network.

FIG. 10 shows a flowchart for generating neural networks for determining stress-strain curves. In step 220, tensile strength tests are firstly carried out in order to determine stress-strain curves for variations of different parameters. For example, it is possible to vary the recipe, that is to say the material composition, as well as the colour and the geometry of the components.

In addition, the processing conditions during the manufacture of the test specimen can be varied. In the case of a plastic injection-molded part, these are, for example, the stock temperature, the mold temperature and the holding pressure. In addition, it is also possible to vary the conditions under which the tensile strength test is carried out, such a condition being, for example, the temperature to which the test specimen is subjected while the tensile strength test is being carried out.

The stress-strain curves determined in such a measurement series are respectively assigned to a particular type in step 221. In such a context it is possible to use, for example, the standardization according to FIG. 9.

In step 222, in each case a number of characteristic points are selected for the standardized stress-strain curves. The number and the position of the characteristic points can vary depending on the type. For example, given a stress-strain curve of the curve type a (cf. FIG. 9), an individual characteristic point, or a small number of characteristic points, may be sufficient, because the curve extends essentially in the linear region.

Given a stress-strain curve of the type b, at least three characteristic points will be necessary to determine the curve profile, specifically the yield point, the tearing point and the minimum value of the stress-strain curve which lies between the yield point and the tearing point. Corresponding characteristic points can also be defined for a curve of the type c and for further curve types.

In step 223, the characteristic points of the stress-strain curves are subjected to a main component transformation. The main component transformation reduces both the noise and redundancy by performing a projection to a relevant subspace in a multidimensional coordinate space. The main component transformation is a mathematical method which is known per se.

A corresponding main component transformation can also be carried out with respect to the curve type.

Before the respective main component transformation is carried out, the transformation rule must firstly be determined. This is done by arranging the previously determined characteristic points of curves of the same curve type in a matrix and determining the parameters of the main component transformation in order to change the matrix to its main component form. Correspondingly, it is also possible to adopt a procedure relating to the transformation rule for the main component transformation of the curve type.

In step 225, the parameters varied in step 220 are input into various neural networks connected in parallel. Each of the neural networks connected in parallel is assigned here to a specific curve type.

If the parameters are input for a tensile strength test in which a stress-strain curve of a particular type has been determined, the output of the neural network corresponding to this curve type is evaluated. The values which are output by the neural network of the respective type are compared with the characteristic points which have been subjected to main component transformation and which have been determined in step 223 for the tensile strength test in question. On the basis of a difference between the values which are output by the neural network and the actual values determined by the main component transformation in step 223, feedback is made into the neural network in order to adapt the weighting of the neurons in accordance with the difference between the values.

The training of the neural networks of the various types is then carried out incrementally by sequentially inputting the various parameters and by respectively reconciling the calculated values with the values obtained by measurement and main component transformation.

In addition, a neural network for determining the curve type from the parameters is also trained in step 226. For this purpose, the corresponding parameters are input into a neural network whose output is intended to indicate the probabilities of the presence of a specific curve type. The output of this neural network is respectively reconciled by means of the actually occurring curve type or with the main component transformation of the actually occurring curve type, and the weighting of the neurons is correspondingly adapted. This neural network for determining the curve type is also trained incrementally by applying the various parameters and performing subsequent reconciliation with the actual curve type.

The training of the type-specific neural networks with the characteristic points which have been subjected to main component transformation, as output variables, is carried out for all the stress-strain curves of the measurement series carried out in step 220. The steps 225 and 226 can be carried out in parallel because the input vector, that is to say a specific quantity of parameters per stress-strain curve, can respectively be the same for the various neural networks.

In step 227, the type-specific neural networks and the neural network for determining the curve type, which have been determined in steps 225 and 226, respectively, are connected in parallel. In step 228, a function for evaluating one of the type-specific neural networks is generated.

The function is provided with the output of the neural network in order to determine the curve type, that is to say the respective probabilities of the presence of a specific curve type. The function determines the maximum value from the various type probabilities and selects that neural network which corresponds to the most probable curve type. As a result, the curve type can firstly be determined on the basis of the input parameters during the operation of the entire neural network which is connected together in this way, in order to select the corresponding type-specific neural network.

Figure 11:
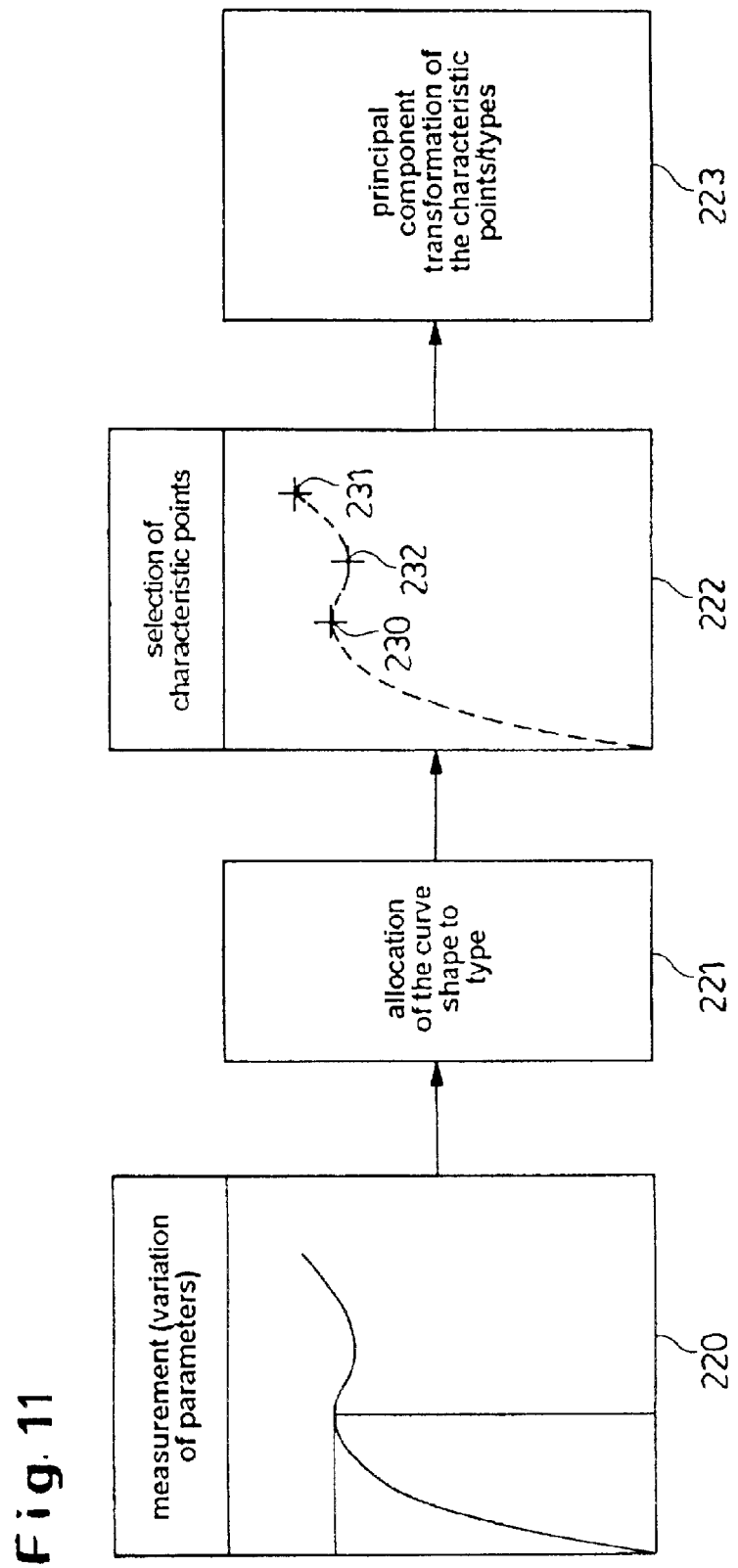
FIG. 11 is a representative flow chart of the sequence of the steps involved in determining the main components of the characteristic points from a stress-strain curve.

FIG. 11 illustrates the determination of the characteristic points, subjected to main component transformation, from a measured stress-strain curve. The steps in FIG. 11, which correspond to the steps in FIG. 10, have been designated here with the same reference symbols. In step 220, a stress-strain curve is firstly measured in the presence of specific parameters, that is to say when there is a specific material composition, colour of the material, geometry of the test piece, processing parameters during the plastic injection-molding process and a specific temperature, test speed and/or further parameters during the execution of the tensile strength test. Such measurements are repeated for different variations of the parameters, that is to say are carried out for different material compositions, colours, geometries of the components etc.

In step 221, the measured curve form is assigned to a specific type. In step 222, characteristic points are then selected depending on the curve type. In the example in FIG. 11, the stress-strain curve is a curve of the type b (cf. FIG. 9), so that at least the yield point 230, the tearing point 231 and the points 232 lying between the yield point 230 and the tearing point 231 are correspondingly selected. Between these points it is possible to select automatically further measurement points, for example at equidistant strain intervals, as characteristic points.

In step 223, the characteristic points which are obtained in this way from all the measured stress-strain curves of the same type are subjected to a main component transformation in order to firstly determine the parameters for executing the main component transformation. The calculation rule which is determined in this way is then used for main component transformation of the characteristic values of the individual curves. The types which have been subjected to main component transformation can also be correspondingly determined for the neural network in order to determine the type probability.

Figure 12:
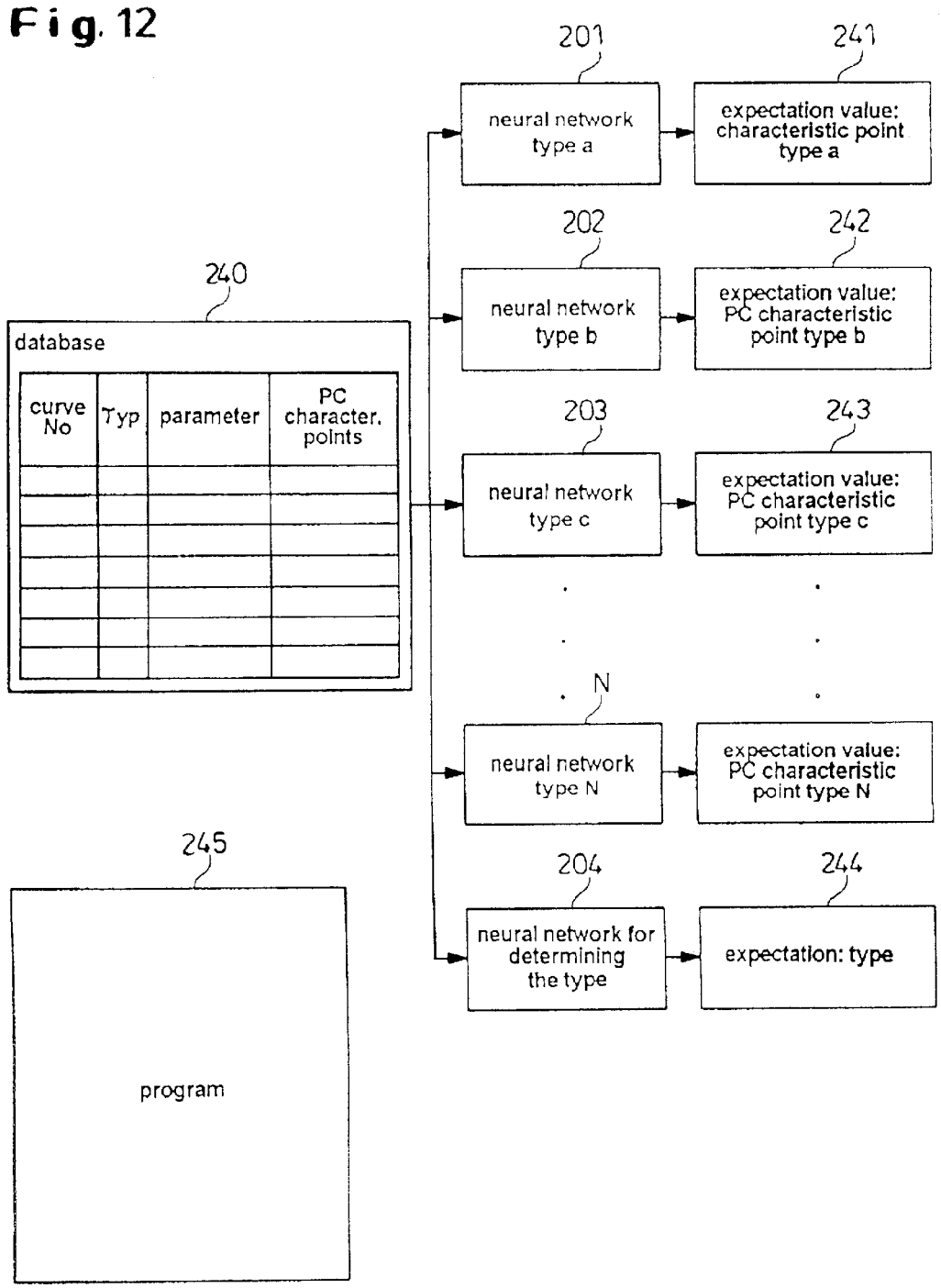
FIG. 12 is a representative block diagram flow chart relating to the training of the neural networks.

FIG. 12 shows a block diagram of a computer system for training the neural networks. The computer system has a database 240, which contains a data record for each measured stress-strain curve. The data record for a stress-strain curve contains the type of curve (for example type a, b or c—cf. FIG. 9) and/or the corresponding main components as well as the main components (HK) of the transformed characteristic points. In addition, the data record contains the varied parameters for each curve.

It is of particular advantage that it is only necessary to store the characteristic points in the database and not all the measured values determined when a stress-strain curve is recorded. As a result, it is possible, for example, to reduce the data from approximately 60 000 measured values to less than 30 characteristic points.

The database is connected to the neural networks 201 to N. In addition, the database 240 is connected to the neural network 204 in order to determine the curve type. Each of the neural networks 201 to N or 204 has a corresponding output 241 to 243 or 244.

In addition, the computer system has a program 245 for reading specific data from the data records stored in the database and for training the neural networks 201 to N or 204.

In order to train the neural networks, the program 245 firstly reads the parameters of the data record of the first curve of the database 240. The parameters which are read are then applied to the inputs of the neural networks 201 to N and of the neural network 204.

In addition, the program 245 reads the curve type of the current curve from the database 240. Depending on the curve type, the output of the corresponding neural network is then read. If the first curve is, for example, of the type c, the output 243 is read.

The values stored in the output 243 are compared with the actual main components of the characteristic points. The weighting of the neural network for the curve type c is correspondingly adapted on the basis of the difference between the calculated main components and the actual main components of the characteristic points.

The neural network 204 is also simultaneously trained by reading the expected value or its HK from the output 244. The probabilities determined for the presence of a specific curve type from the neural network 204 are compared with the actual curve type or the corresponding HK which is stored in the database 240 for the curve in question—the curve type c in the example in question. The neural network is correspondingly adapted here on the basis of the difference between the probabilities determined and the curve type which is actually present.

Figure 13:
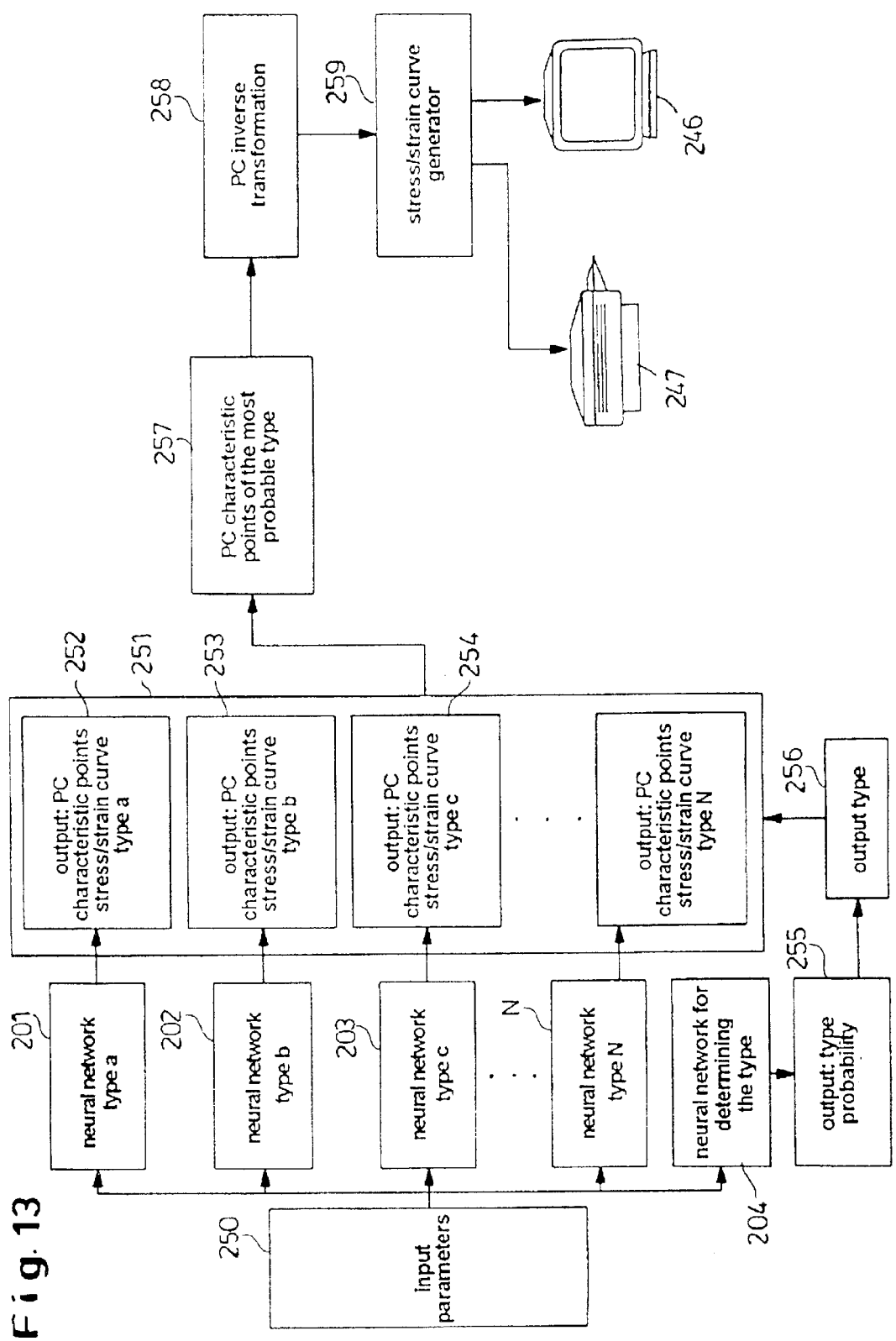
FIG. 13 is a representative block diagram flow chart of a neural network for determining a stress-strain curve on the basis of input parameters.

FIG. 13 shows the resulting hybrid model for determining a stress-strain curve. The system has an input 250 for inputting the parameters. The input 250 is connected to the inputs of the neural networks 201 to N and to the input of the neural network 204. The system also has an output 251 with the memories 252, 253, 254 . . . each for the neural networks 201 to N. The memories 252, 253, 254 . . . are respectively connected to an output of the corresponding neural network 201, 202, 203.

The neural network 204 has an output 255 for outputting the type probabilities or their HK. In the program module 256, the curve type is selected on the basis of the type probability, if appropriate in accordance with a corresponding inverse transformation. The program module 256 selects a corresponding memory from the memories 252, 253, 254 . . . contained at the output 251. The content of this memory is read from the corresponding memory by the program module 257 and subjected to an inverse transformation of the main components in the program module 258.

On the basis of the inversely transformed main components, a stress-strain curve is then generated in the stress-strain curve generator 259. The stress-strain curve generated in this way can be displayed, for example, on a screen 246 or printed out on a printer 247.

Figure 14:
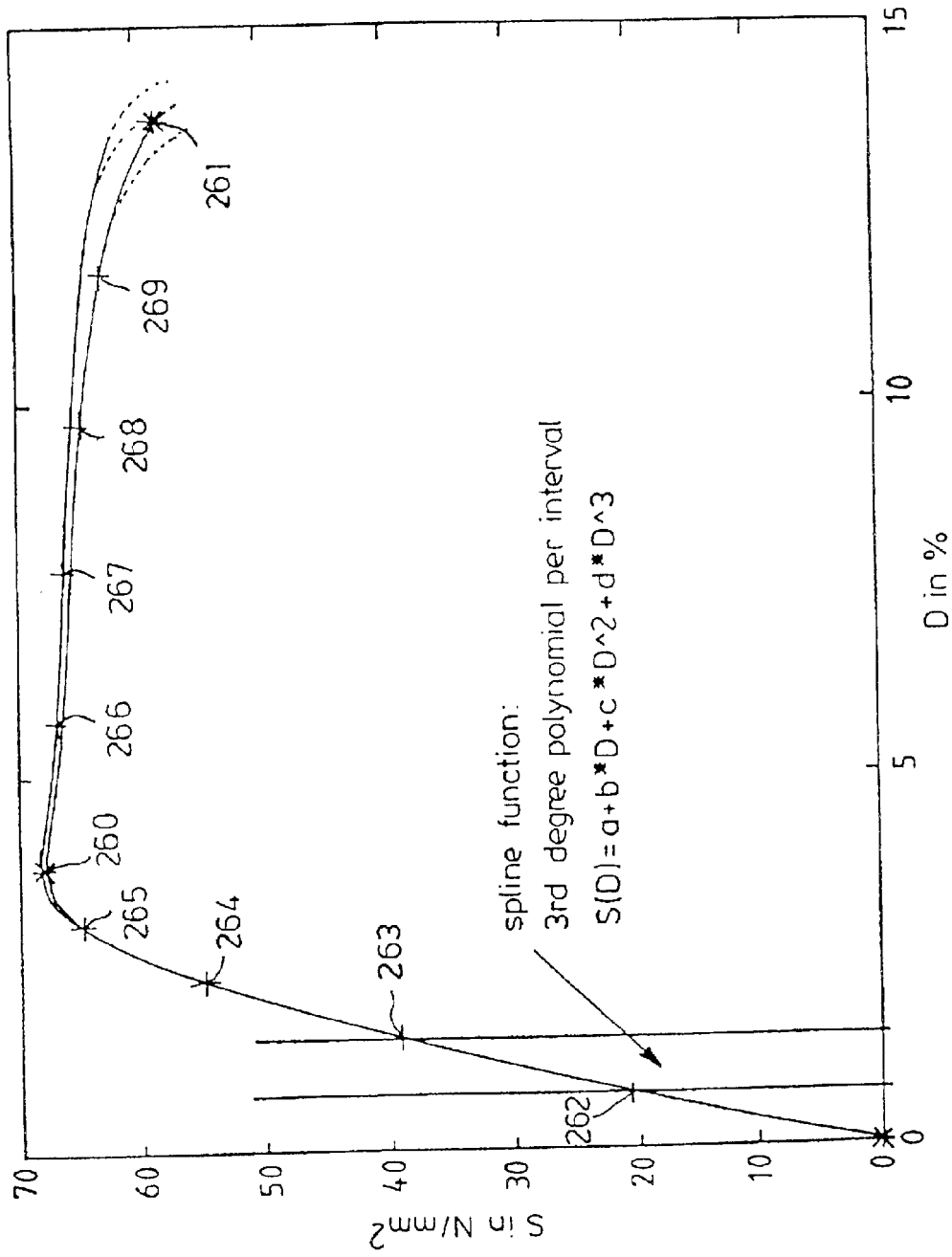
FIG. 14 is a graphical representation of the selection of the characteristic points from a stress-strain curve.

FIG. 14 shows the selection of characteristic points by a user. In the case of the curve type in FIG. 14, the characteristic points 260 and 261 are selected by the user, for example. The intermediate points 262 to 268 are then automatically set at equidistant points and automatically selected as further characteristic points.

The characteristic points 260 to 268 which are selected in this way are fed into the generator 259, and the result of the stress-strain curve calculation by the generator 259 is displayed to the user for checking purposes on the same screen. The user has the possibility of displacing both the manually set characteristic points (in a desired way) and the automatically set intermediate points (only vertically) in order to optimize the curve determined by the generator 259. In the case of the curve calculated by the generator 259, one third-degree spline polynomial is used per subinterval, the respective characteristic points being used for approximation purposes.

Figure 15:
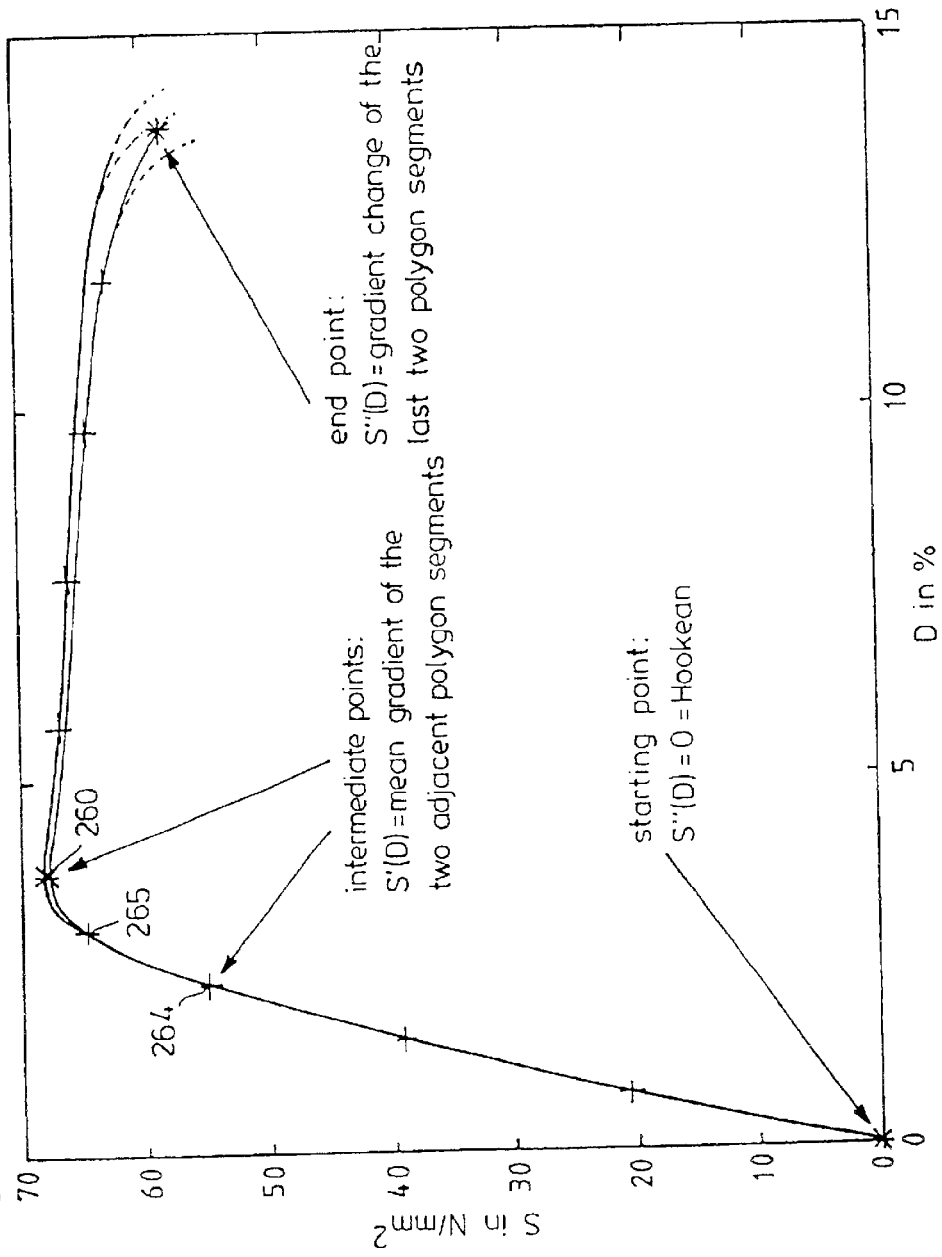
FIG. 15 is a graphical representation of the peripheral conditions for generating stress-strain curves from characteristic points.

FIG. 15 shows further peripheral conditions for the generation of a stress-strain curve from the selected characteristic points. The start of the stress-strain curve calculated by the generator 259 is at the origin. The second deviation of the calculated curve S is equal to 0 at the origin—which corresponds to what is referred to as Hooke's region.

The average gradient of the adjoining polygonal lines is taken into account for all the intermediate points 262 to 269 (in FIG. 14) on the calculated curve during the determination of the spline polynomial. In contrast, the change in gradient of the last two polynomial lines is used as the basis for the calculation at the end point 261 (in FIG. 14) of the stress-strain curve.

In addition, it is advantageous to parameterize the stress-strain curve as a curve with an artificial "time" in order to prevent overshooting. Furthermore, the generator 259 can contain a sorting function. The strain of the test specimen as the stress rises can physically only become greater. In the case of a calculated curve profile which contradicts this physical condition, it is possible to correct the curve profile by sorting the strain values.

Figure 16:
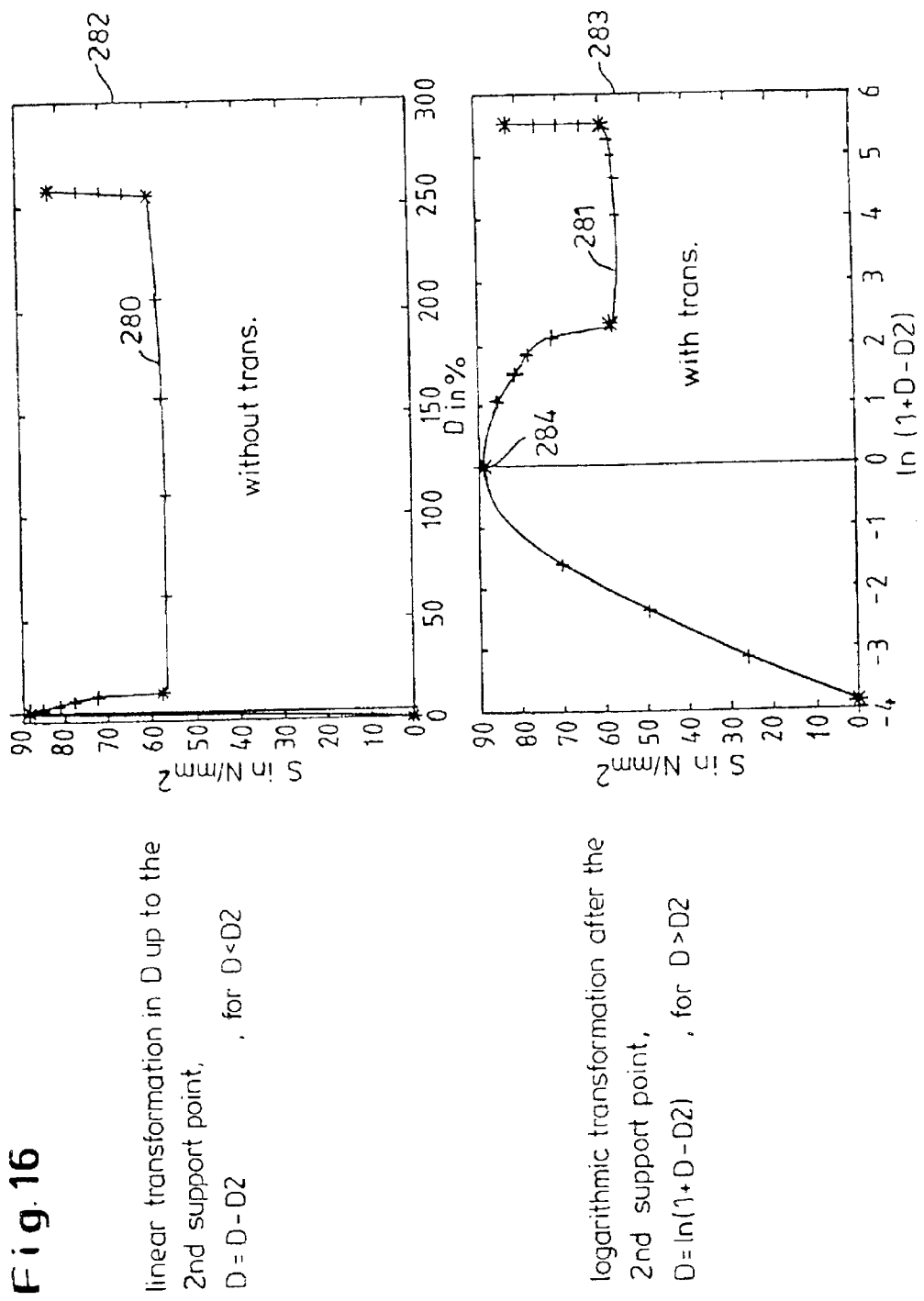
FIG. 16 is a graphical representation of the stabilization of the spline interpolation by means of a logarithmic scaling on a subinterval.

FIG. 16 shows the stress-strain curves 280 and 281. The stress-strain curve 280 has a very steep profile in its initial region. The linear initial region is, however, particularly relevant for practical purposes, and it is therefore recommended to expand it by means of a suitable transformation:

The stress-strain curve 281 is obtained from the stress-strain curve 280 in that a logarithmic scaling of the strain D is used in the curve region after the characteristic point 284. As a result, the curvature characteristics of the transformed curve are homogenized and the spline interpolation method is stabilized.

In addition, the characteristic points are also stored in a database 17 in the hybrid model in FIG. 2 for direct access. Firstly, when specific parameter values are input into the input 1, a check is made to establish whether the characteristic points have not previously already been determined for these parameter values and stored in the database 17. If this is the case, the stress-strain curve can be calculated directly in the downstream stress-strain curve generator 14.

Figure 17:
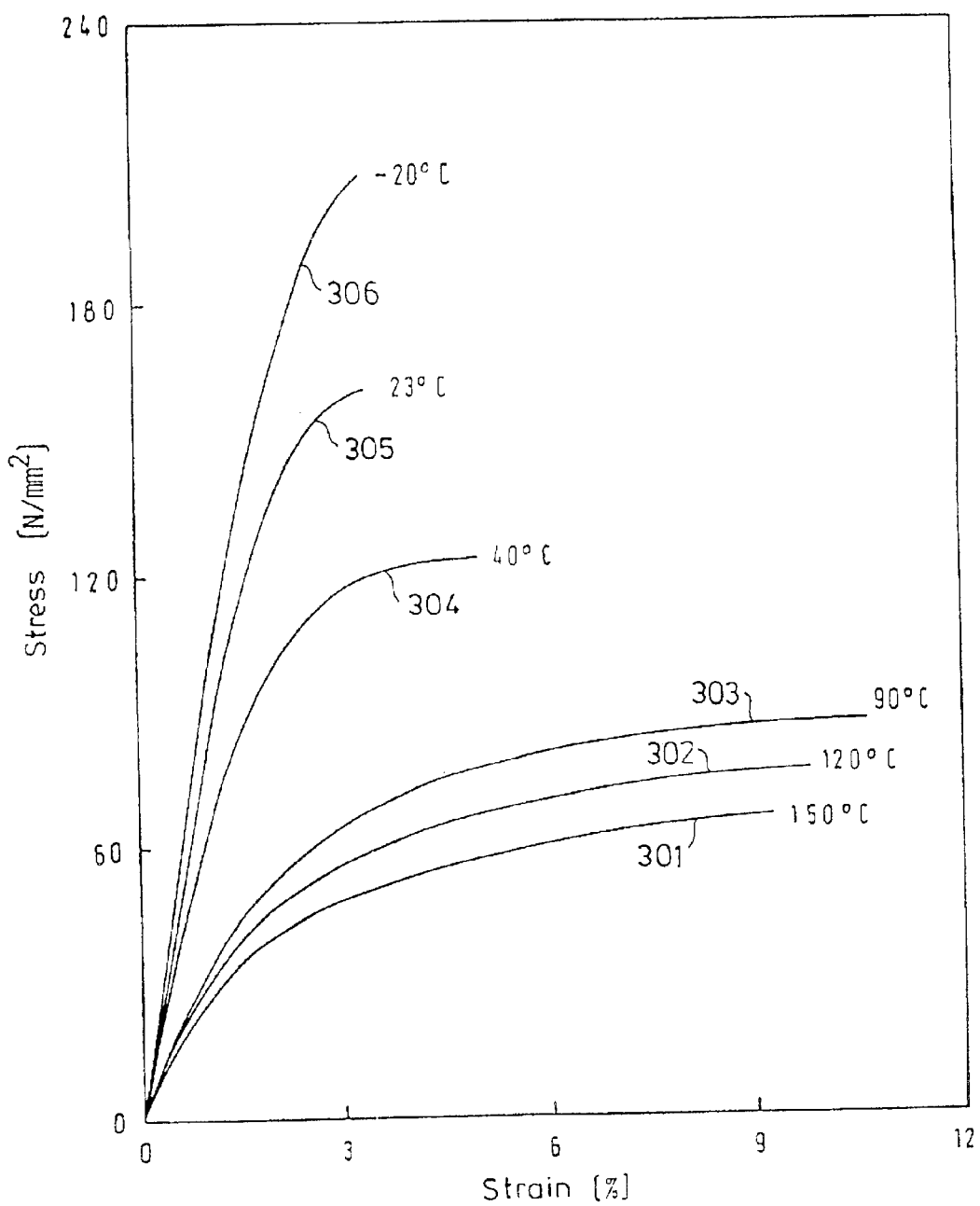
FIG. 17 is a graphical representation of stress-strain curves for various temperatures with tensile loads applied for a short time.

The stress-strain curve generator 14 in FIG. 2 supplies optimum results only for brief loading operations. Coefficients for a rigorous model 16 which are stored in a database 15 are used to simulate the long-term case; therefore, the rigorous model 16 is used for the long-term case instead of the neural network NN7 and instead of the stress-strain curve generator 14. The way in which the coefficients of the database 15 are determined and the method of operation of the rigorous model 16 will be explained in more detail below:

FIG. 17 shows a group of stress-strain curves 301 to 306. The curves have been respectively measured for the material Durethan-BKV 130 (polyamide modified with fibre glass and rubber) with a pull rod of 4 mm in thickness in a tensile strength test with 5 mm per minute drawing speed in the state in which they are freshly removed from the mold.

The stress-strain curve 301 was measured at a temperature of 150° celsius; the further stress-strain curves 302 to 306 were measured at temperatures of 120° celsius, 90° celsius, 40° celsius, 23° celsius and −20° celsius. A calculation using the method according to the invention also yields the same curves.

In order to describe the relationship between the stress σ and the strain ϵ as a function of the temperature T given a short-term tensile loading—as illustrated in FIG. 17—the following approach is selected:

$$\sigma(T, \epsilon) = A_1 + A_2 + A_3 + A_4 \quad (1)$$

where $$A_1 = c_1 \epsilon + c_2 \epsilon^3 + c_3 \epsilon^5 + c_4 \ln(\epsilon + \vec{\sqrt{\epsilon^2}}) \quad (2)$$

$$A_2 = c_5 \epsilon T + c_6 \epsilon T^3 + c_7 \epsilon T^5 \quad (3)$$

$$A_3 = c_8 \epsilon^3 T + c_9 \epsilon^3 T^3 + c_{10} \epsilon^3 T^5 \quad (4)$$

$$A_4 = c_{11} \epsilon^5 T + c_{12} \epsilon^5 T^3 + c_{13} \epsilon^5 T^5 \quad (5)$$

In order to determine the coefficients $c_1$ to $c_{13}$, for example five to ten, preferably five to seven, short-term tensile strength tests are carried out here at various temperatures for a specific material. On the basis of the stress-strain curves determined experimentally, the resulting equation system is numerically solved so that the values of the coefficients $c_1$ to $c_{13}$ are obtained.

The equation (1) which is parameterized in this way therefore describes the relationship between the stress σ and the strain ϵ for any desired temperatures T for a specific material under short-term tensile loading.

The corresponding calculated curve profiles are also illustrated in FIG. 17; in the embodiment in question the calculated curves and the measured curves are largely congruent. Deviations between the measured curves and the calculated curves may, however, occur due to scatterings related to the measurements and the materials.

The creepage characteristics of the material in the stress rupture test are described by a power function according to Findley:

$$\varepsilon(t) = \frac{\sigma}{E} + m\left(\frac{t}{t_o}\right)^n \quad (6)$$

$t_0$ being a unit time and m and n being referred to as creepage parameters. Equation (6) therefore contains the elastic strain component and the viscoelastic and viscous strain component which is defined by the unit time $t_0$ and the creepage parameters m and n as well as the modulus E of elasticity.

Figure 18:
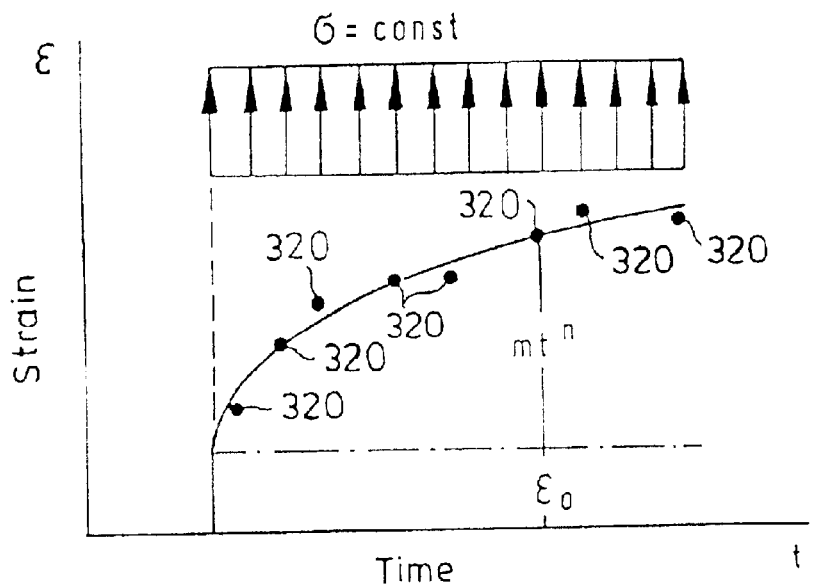
FIG. 18 is a graphical representation of a power function according to Findley for a stress rupture test.

FIG. 18 is a schematic view of the principle of a stress rupture test. Here, a test piece is subjected to loading which is constant over time by, for example, suspending a defined weight from the test piece. Measurement points 320 are then determined at different times by determining the strain ϵ which is respectively occurring at the particular time.

Figure 19:
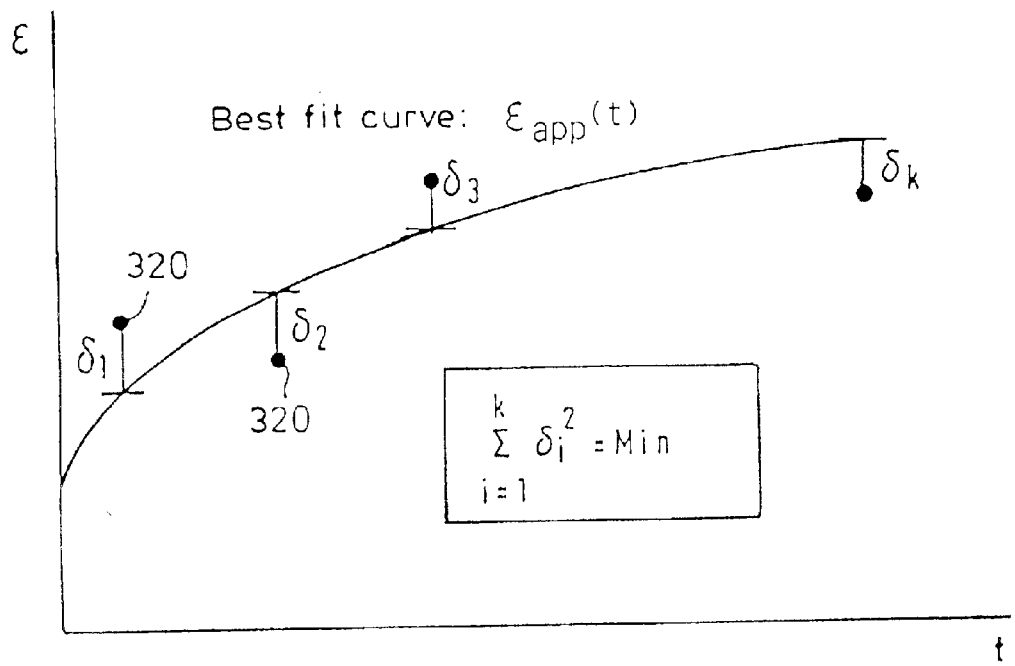
FIG. 19 is a graphical representation of the determination of an approximated curve profile for strain as a function of time for the power function according to Findley.

FIG. 19 illustrates the determination of the creepage parameters m and n from the measurement points 320 which are determined using the method of least error squares. Here, the differences $\delta_1$ to $\delta_k$ between the measurement points 320 and an approximated strain curve $\epsilon_{app}(t)$ are included in the determination of the creepage parameters m and n.

The creepage parameters m and n which are determined in this way then describe the variation in the strain over time for a specific stress σ and a specific temperature T. The approximated strain curve can also be extrapolated for long loading periods.

In order to obtain more general information from the equation (6), the creepage parameters m and n are respectively expressed as a function of the stress σ:

$$\varepsilon(t, \sigma) = \frac{\sigma}{E} + m(\sigma)\left(\frac{t}{t_0}\right)^{n(\sigma)} \quad (7)$$

Figure 20:
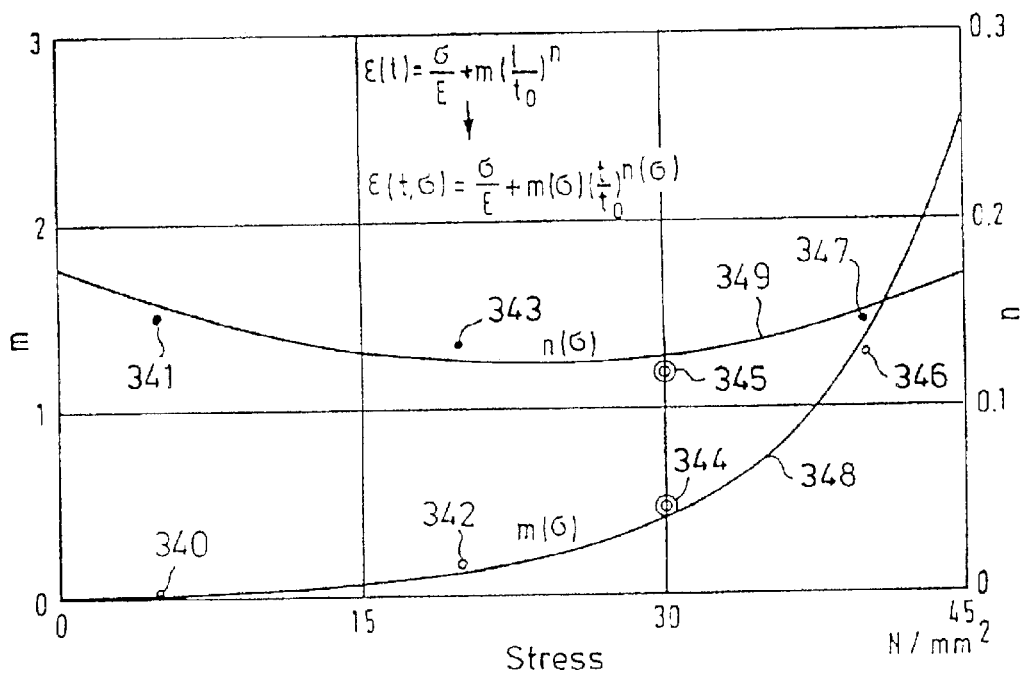
FIG. 20 is a graphical representation of the profiles of the coefficients n (σ) and m (σ) as a function of stress in a stress rupture test for a specific temperature.

Stress rupture tests are then respectively carried out at the same temperature but with a different constant stress σ, and the creepage parameters m and n are determined for the different stresses σ. A result of such a measurement series is shown in FIG. 20. The measurement series were carried out with a constant temperature T here.

The curve 348 gives the stress-dependent profile of the creepage parameter m; the curve 349 gives the stress-dependent profile of the creepage parameter n. The curves 348 and 349 are determined from the value pairs for m and n which are determined from the individual stress rupture tests for different stresses.

For example, a stress rupture test is carried out with a stress of approximately 5 newtons per $mm^2$, the parameter value point 341 being obtained for n and the parameter value point 340 being obtained for m. Corresponding stress rupture tests are carried out for stresses of approximately 20 newtons per $mm^2$, 30 newtons per $mm^2$ and 40 newtons per $mm^2$, so that the further value pairs points 342, 343; 344, 345; 346, 347 for the creepage parameters m and n are respectively obtained for the various stresses, as illustrated in FIG. 20.

Figure 21:
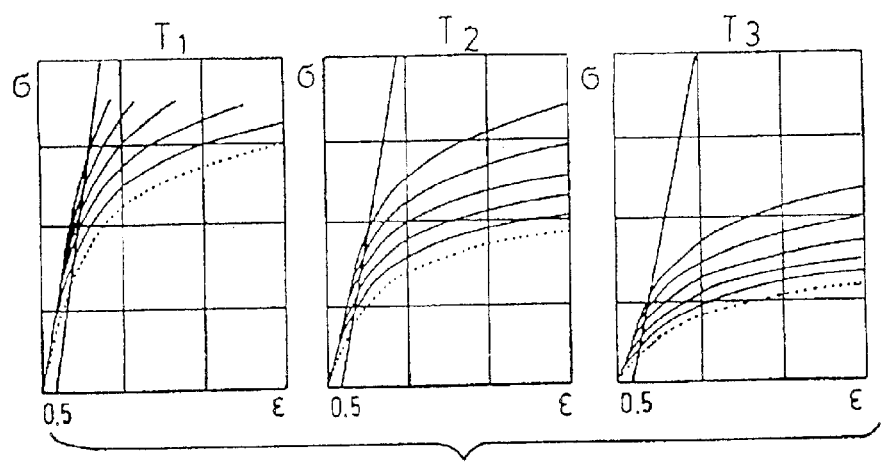
FIG. 21 is a graphical representation of the functions used to approximate the stress-dependent profiles of the coefficients m and n and the determination of the coefficients of these functions, in each case for a specific temperature $T_1$, $T_2$ and $T_3$.

Corresponding stress rupture tests for different stresses σ are carried out, for example, for three different temperatures $T_1$, $T_2$ and $T_3$, as illustrated in FIG. 21. Corresponding curve profiles of the creepage parameters m and n corresponding to the curves 347 and 348 in FIG. 20 are then determined for each of the temperatures $T_1$, $T_2$ and $T_3$.

The curve profiles of the creepage parameters m and n are approximated below by means of the following approaches:

$$m(\sigma) = a_1 \cdot \sinh \frac{\sigma}{\sigma_0 \cdot a_2} \quad (8)$$

$$n(\sigma) = b_0 + b_1\left(\frac{\sigma}{\sigma_0}\right) + b_2\left(\frac{\sigma}{\sigma_0}\right)^2 \quad (9)$$

$a_1$, $a_2$ and $b_0$, $b_1$ and $b_2$, respectively, being parameter values which are dependent on the temperature T.

Figure 22:
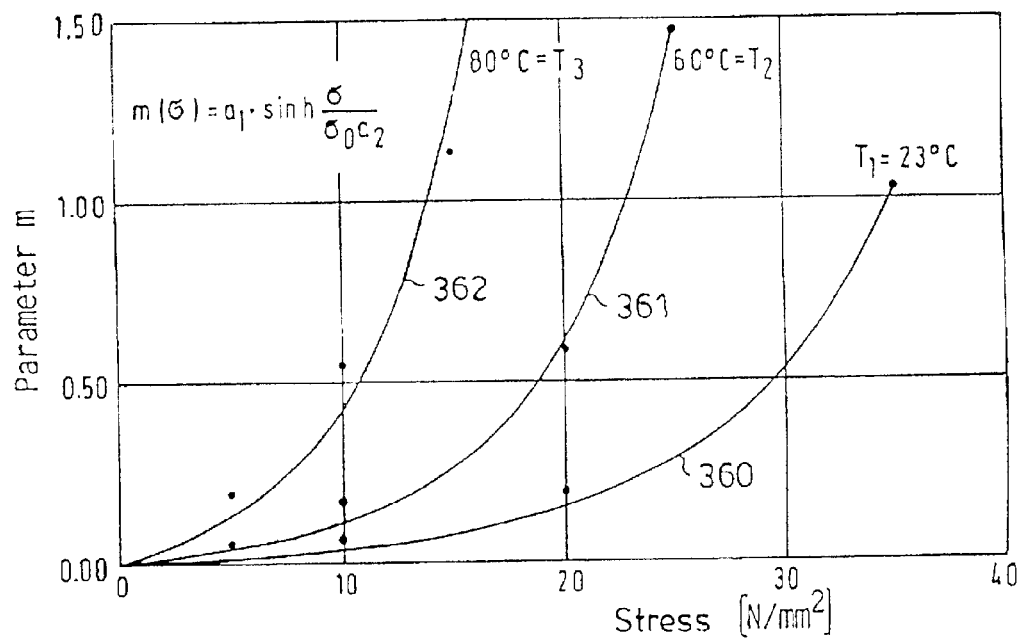
FIG. 22 is a graphical representation of the profile of the coefficient m ($\sigma$) for three different temperatures.

FIG. 22 shows three different profiles of the creepage parameter m as a function of the stress for three different temperatures $T_1 = 23°$ celsius, $T_2 = 60°$ celsius and $T_3 = 80°$ celsius, from which the curve profiles 360, 361 and 362 are obtained.

Figure 23:
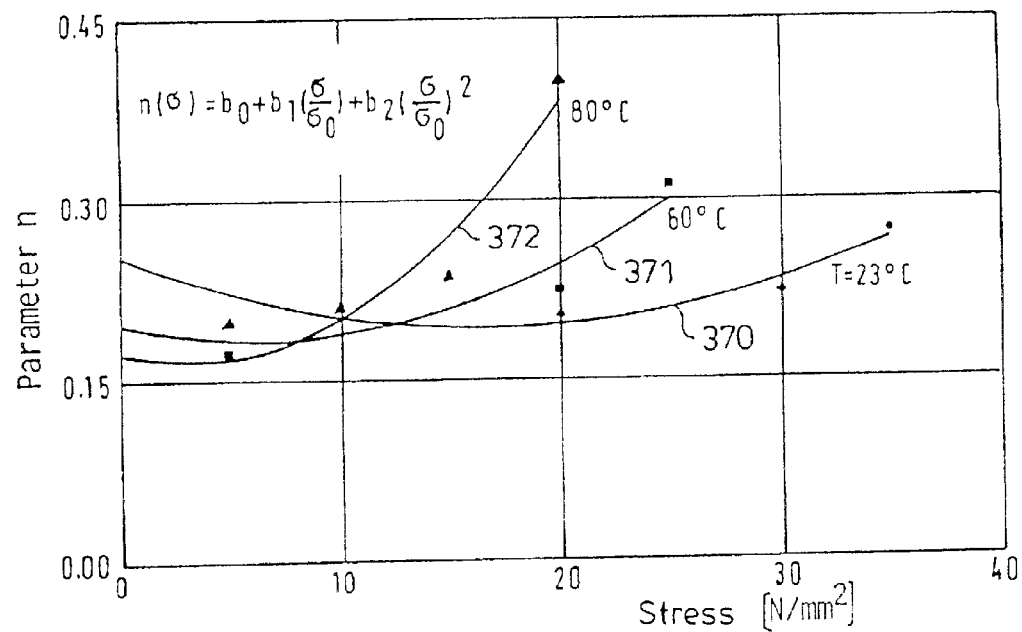
FIG. 23 is a graphical representation of the profile of the coefficient n ($\sigma$) for three different temperatures.

FIG. 23 shows the corresponding curves 370, 371 and 372 of the creepage parameter n, in each case for a specific temperature as a function of the stress.

In order to determine the curves 360, 361 and 362 and 370, 371 and 372, in each case the values of the coefficients $a_1$, $a_2$ and $b_0$, $b_1$ and $b_2$ of the formulae (8) and (9) are respectively determined from the stress rupture tests on the basis of the individual values respectively determined for the creepage parameters m and n. The corresponding individual values are also illustrated in FIGS. 22 and 23.

Figure 24:
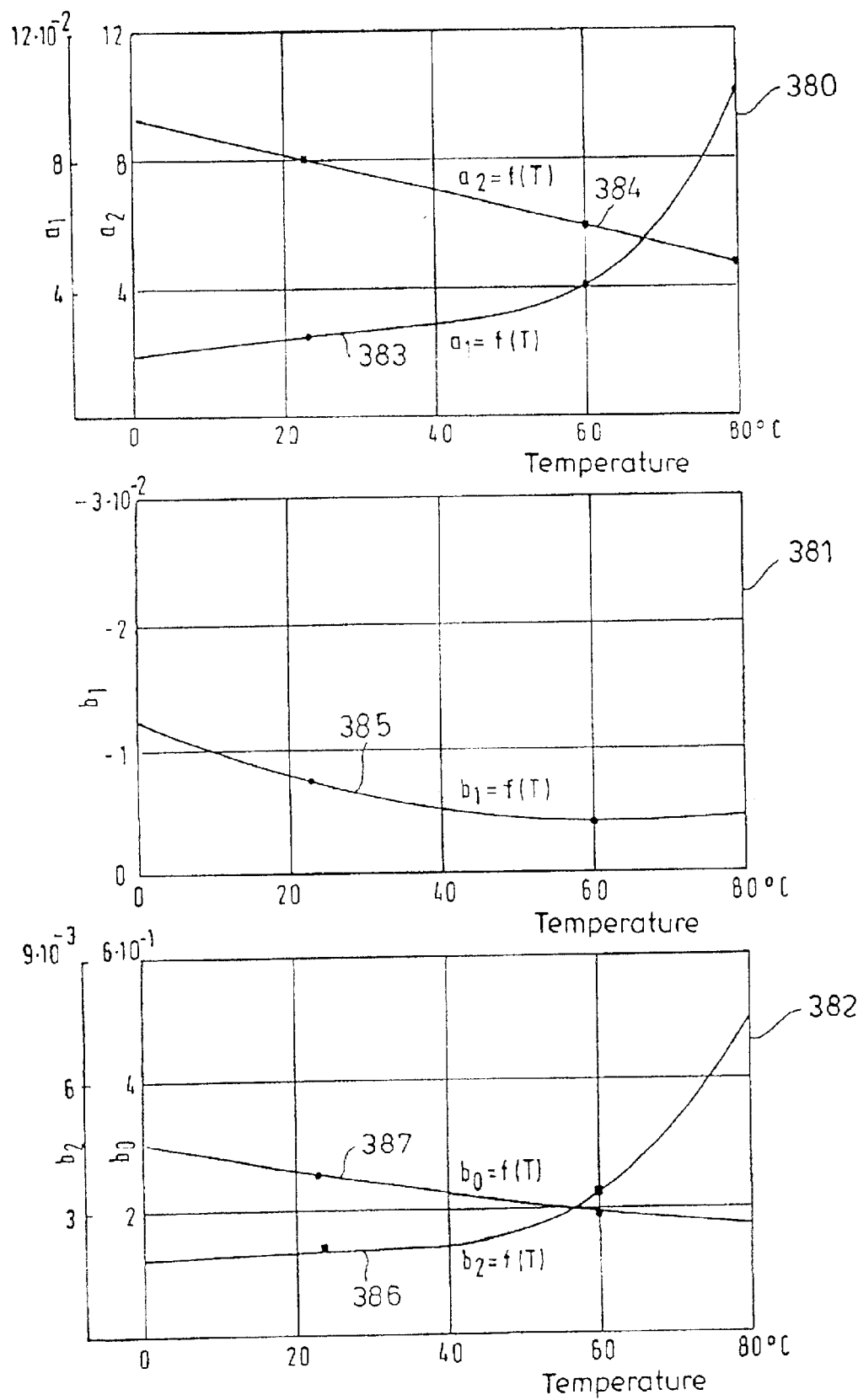
FIG. 24 is a graphical representation of the temperature-dependent profiles of the coefficients $a_1$, $a_2$ and $b_0$, $b_1$ and $b_2$ resulting from the profiles n ($\sigma$) and m ($\sigma$)

FIG. 24 shows the diagrams 380, 381 and 382. Diagram 380 illustrates the profile of the parameters $a_1$ and $a_2$ as a function of the temperature. The corresponding curves 383 and 384 are determined on the basis of the values for $a_1$ and $a_2$ which are determined for the temperatures $T_1$, $T_2$ and $T_3$, by virtue of the fact that a polynomial, for example a spline polynomial, is drawn through the points determined.

Correspondingly, diagram 381 shows the curve profile 385 for the parameter $b_1$ as a function of the temperatures, the curve 385 having been in turn determined on the basis of the parameter values determined at the temperatures $T_1$, $T_2$ and $T_3$. Here too, a polynomial, for example a spline polynomial, can again be used to describe the curve 385.

Diagram 382 shows the corresponding curves 386 and 387 for the corresponding profiles of the coefficients $b_0$ and $b_2$.

Figure 25:
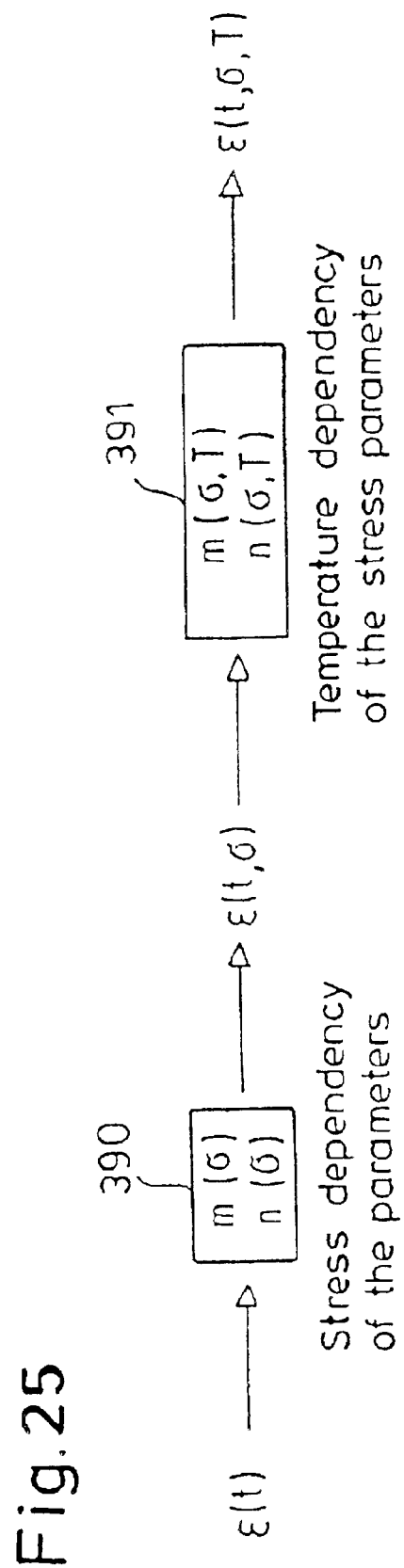
FIG. 25 is a representative flow chart of the steps necessary to determine the group of stress-strain curves as a function of temperature and the duration of stress loading.

FIG. 25 illustrates the incremental expansion of the Findley approach according to formula (6) which is dependent only on the time, to a relationship which is dependent on the time t, stress σ and temperature T.

To do this, firstly the creepage parameters m and n are respectively expressed as a function of the stress σ in step 390 so that the equation (7) is obtained. In the next step 391, the creepage parameters m and n are then additionally expressed as a function of the temperature T by inserting the temperature-dependent parameters $a_1$, $a_2$ and $b_0$, $b_1$ and $b_2$, respectively, according to formulae (8) and (9). This ultimately results in the following relationship:

$$\varepsilon(t, \sigma, T) = \frac{\sigma}{E(T)} + m(\sigma, T)\left(\frac{t}{t_0}\right)^{n(\sigma,T)} \quad (10)$$

Figure 26:
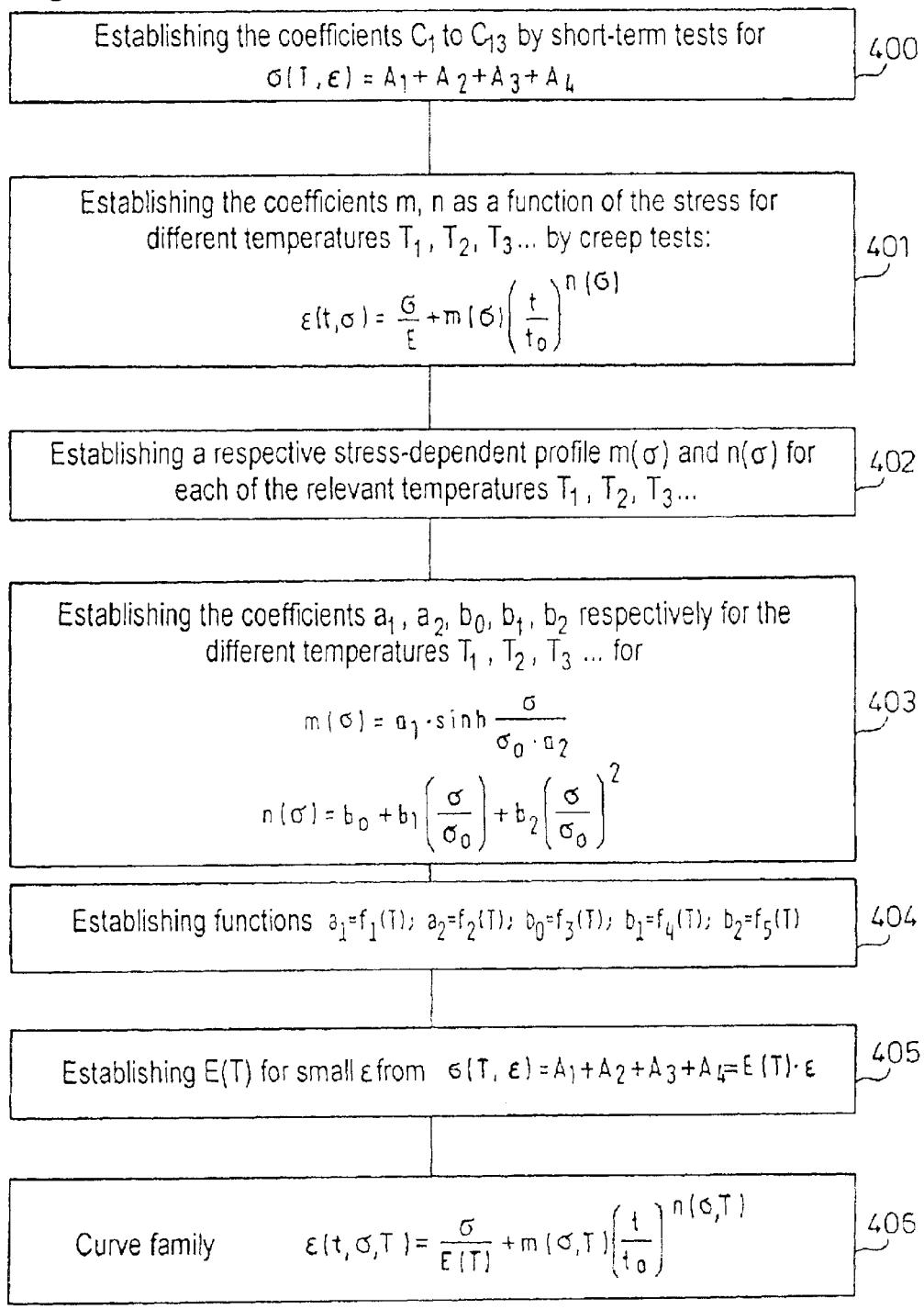
FIG. 26 is a representative flow chart of a detailed view of the steps in FIG. 25 by means of a preferred embodiment.

FIG. 26 shows a flowchart of a method according to the invention for determining a relationship between the strain ε and the stress σ as a function of the time t and the temperature T. In step 400, the case of short-term loading, for example, is firstly investigated by means of short-term tensile strength tests. As a result, the coefficients $c_1$ to $C_{13}$ of the approach (1) are determined. The resulting function therefore then describes the relationship between the stress σ and the strain ε as a function of the temperature T during short-term loading.

In step 401, the behaviour of the material to be investigated is then examined for the case of long-term loading. To do this, stress rupture tests are respectively carried out for specific temperatures $T_1$, $T_2$ and $T_3$ with respectively different constant stresses σ, and in each case a value pair for the creepage parameters n and m is determined from the stress-strain curves determined.

This results, in step 402, in a stress-dependent profile for each of the creepage parameters m and n as a function of the stress σ for each of the temperatures in question, as also represented in FIGS. 22 and 23 by means of an example.

In order to determine the creepage parameters it has been found that, given, for example, a test period of approximately seven weeks (approximately 1 000 hours), the invention permits a sufficiently precise approximation which describes the strain even for loading periods of over a year and longer. This is explained in more detail below with reference to FIGS. 27 and 28.

In step 403, the parameters $a_1$, $a_2$ and $b_0$, $b_1$ and $b_2$ of the approaches (8) and (9) are determined from the experimentally determined value points of the stress-dependent profiles of m and n. This results in corresponding values of the coefficients of approaches (8) and (9) for each of the temperatures in question.

The values of these coefficients are respectively temperature-dependent. In order to describe the respective temperature relationship, a function f(T) is applied, for example by means of a polynomial approach or spline-polynomial approach, through the respectively determined value points. The corresponding polynomials $f_1$ to $f_5$ are determined in step 404, corresponding to curves 383 to 386 in FIG. 24.

In step 405, the modulus E(T) of elasticity is determined from the formula (1) by assuming, for example, a relatively small value between 0.05% and 0.25% for the strain ε, i.e. a strain in Hooke's linear region.

In step 406, the relationships which are determined are then inserted into the formula (10), i.e. the relationship E(T) determined in step 405, and the relationships for the creepage parameters m and n, which result from the approaches (8) and (9) and the profiles of the corresponding coefficient values which are determined, are described by the functions $f_1$ to $f_2$ and are dependent on the temperature T.

The formula (10) which is expressed in this way therefore directly specifies a relationship between the strain σ and the stress ε for any times t and any temperatures T.

The formula (10) can be implemented by means of a computer program in a data processing system, for example a personal computer, so that a stress-strain curve can be calculated directly and displayed by inputting, for example, a time t which is of interest and a specific temperature T. By varying the temperature T, the diagram in FIG. 17, for example, is then obtained purely computationally.

Figure 27:
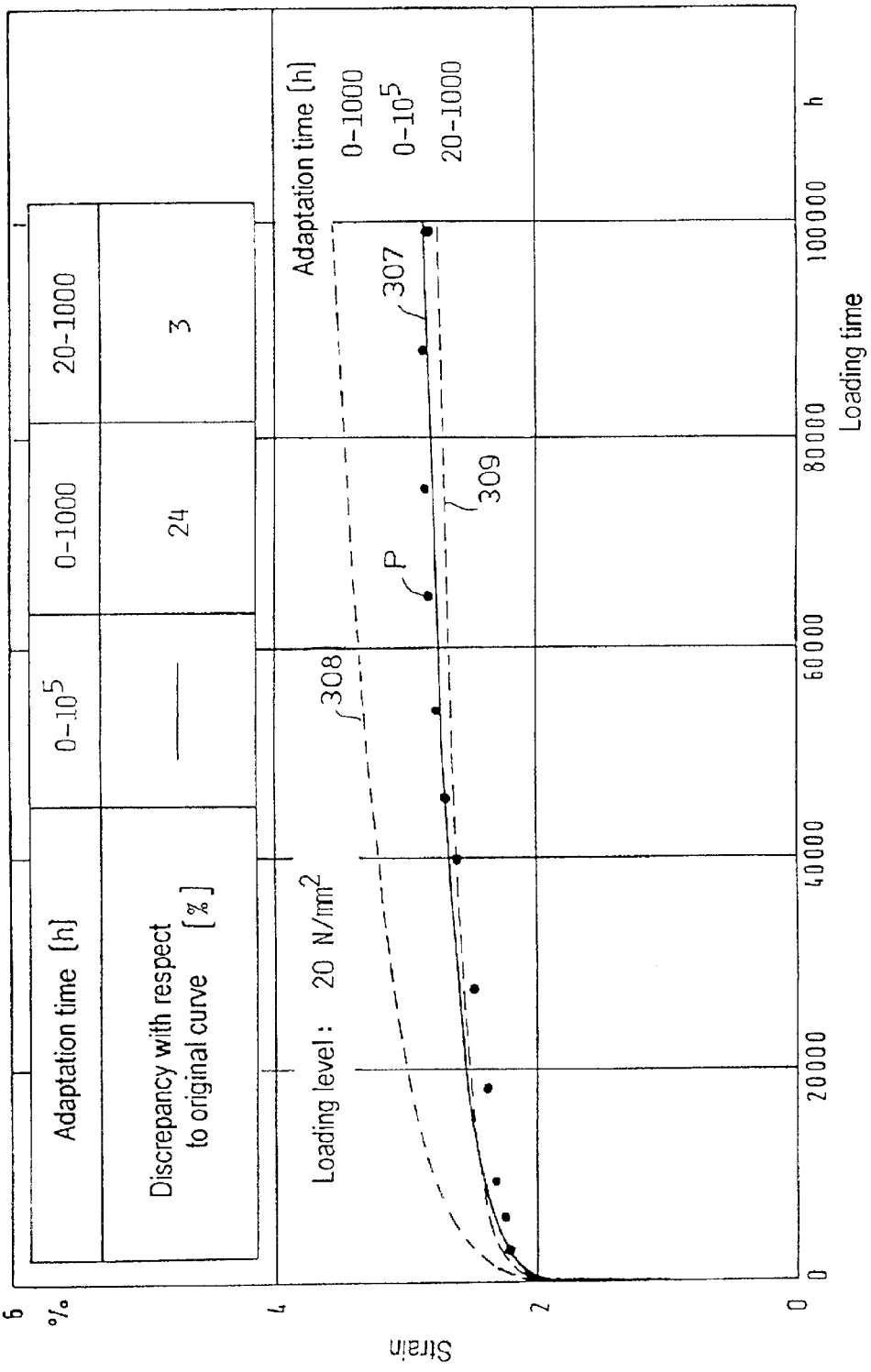
FIG. 27 is a graphical representation of a view of actual and calculated strain profiles for a stress rupture test.

FIG. 27 shows the strain over the loading period. The curve 307 was determined in a stress rupture test of a loading period of 100 000 hours (approximately 10 years) in total. In addition, FIG. 27 shows the measurement points P on which the curve 307 is based.

The dashed curve 307 in FIG. 27 is a curve profile calculated from the formula (6), measurement points P for loading periods of between t=0 and t=1 000 hours being taken into account in order to determine the creepage parameters m and n. The dashed curve 309 corresponds to the curve 308, but only measurement points between t=20 hours and t=1 000 hours have been taken into account in the approximation calculation. The failure to take into account the measurement points in the initial region between t=0 and t=20 hours provides a significantly improved approximation of the curve 309 to the curve 307 which is actually measured, in comparison to the curve 308.

Figure 28:
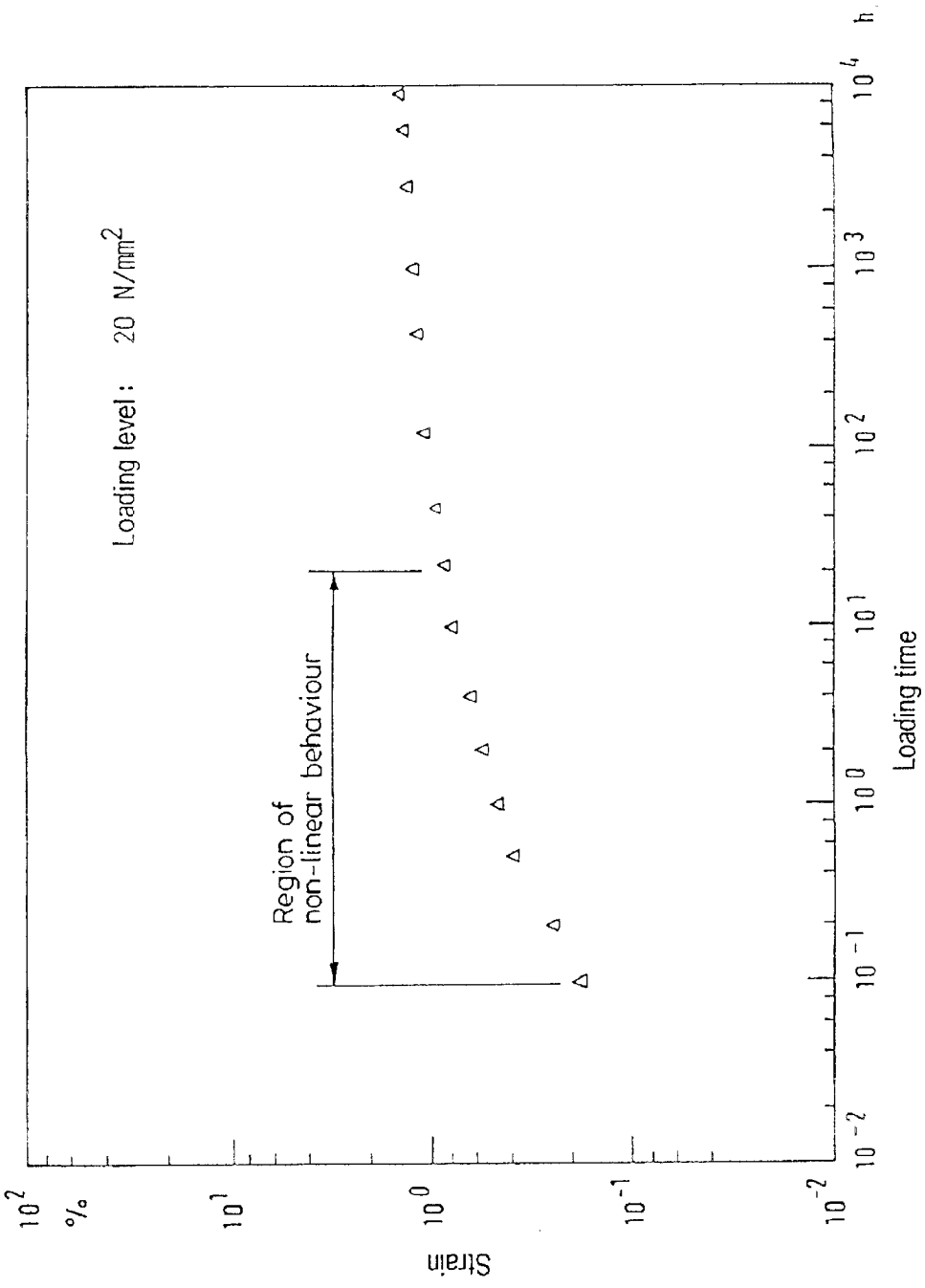
FIG. 28 is a graphical representation of the non-linear initial region of strain in a stress rupture test plotted against the duration of loading.

Generally, a more precise extrapolation can be obtained if the measured values in an initial range up to approximately t=20 to 100 hours are not taken into account for the determination of the creepage parameters m and n. This is due to the fact that the material exhibits non-linear behaviour in the initial range. This is also clarified by FIG. 28:

FIG. 28 shows the strain in % as a function of the loading period for a loading operation of 20 N/mm². From the profile of the measured values in FIG. 28 it is apparent that the material behaviour in the initial range is non-linear up to approximately 20 hours and then merges with a linear profile. In order to determine the initial range precisely it is therefore necessary to determine the transition between the non-linear and linear behaviour.

The method according to the invention for determining the relationship between the stress σ and the strain ε therefore makes it possible to drastically reduce the costs and the time required to determine the material properties of plastics. In addition, this method makes it possible to construct plastic parts with a greater degree of precision, particularly as far as the long-term behaviour of the material is concerned, by virtue of the results which have been acquired and expressed by means of the formula (10).

The method according to the invention also permits a statement to be made about the loading limit of the material.

The experience obtained from the long-term behaviour and observations of numerous experimental results from tensile creepage tests at room temperature and at higher temperatures shows that unreinforced thermoplasts are at their dimensional limit if 0.5% non-elastic strain is added to the elastic strain. The line of 0.5% non-elastic strain corresponds to that load at which an overproportional strain is apparent within the loading period.

FIG. 29 shows the sequence for the generation of a database, for training the neural networks of the hybrid model. Firstly, in step 30, a series of tests is carried out during which respective plastic molded parts are manufactured while varying, for example, recipes and injection molds (thickness) and varying processing parameters and machine parameters of the plastic injection-molding machine, said molded parts then being subjected to analysis. In step 31, a database is generated from the data determined in step 31. This database includes the input parameters for each data record, that is to say the respective recipe parameters and mold parameters as well as the processing parameters and machine parameters and the corresponding resulting properties of the manufactured plastic molded part, in particular its mechanical properties as well as the characteristics of the manufacturing process, that is to say the processing properties, thermal properties, rheological properties and the processing time.

FIG. 30 shows the procedure for training the individual neural networks of the hybrid model. In step 41, the serial variable m is firstly initialized with the value 1.

In step 42, the first neural network NN1 is trained. To do this, the database is accessed in order to call the input parameters necessary for training the respective neural network NN1. The output of the neural network NN1—the density in the example in FIG. 2—is compared with the value determined in the experiment. Given a difference between the forecast value and the actual value, the weightings of the neurons of the neural network NN1 are correspondingly adapted, as is known per se. After the training of the neural network NN1 has been terminated in step 42, the serial variable m is incremented in step 43, and step 42 is repeated until all the neural networks $NN_m$ have been trained.

| | |
|---|---|
| Input | 1 |
| Neural network | 2 |
| Input | 3 |
| Mapping module | 4 |
| Training module | 5 |
| Output | 6 |
| Rigorous model | 7 |
| Rigorous model | 8 |
| Rigorous model | 9 |
| Rigorous model | 10 |
| Module | 11 |
| Database | 12 |
| Rigorous model | 13 |
| Stress-strain curve generator | 14 |
| Database | 15 |
| Rigorous model | 16 |
| Database | 17 |
| Mold die | 101 |
| Torque sensor | 102 |
| Normal force sensor | 103 |
| Pneumatic cylinder | 104 |
| Guides | 105 |
| Guide struts | 106 |
| Guide plate | 107 |
| Clamping plate | 108 |
| Molding nest | 109 |
| Driver | 110 |
| Sprue bush | 111 |
| Clamping plate | 112 |
| Elastic elements | 113 |
| Plastifying unit | 114 |
| Toothed belt | 115 |
| Crown gear | 116 |
| Clutch | 117 |
| Gearbox | 118 |
| Electric motor | 119 |
| Test specimen | 120 |
| Sprue | 121 |
| Bulge | 122 |
| Planar regions | 123 |
| Neural network | 201 |
| Neural network | 202 |
| Neural network | 203 |
| Neural network | 204 |
| Yield point | 230 |
| Tearing point | 231 |
| Point | 232 |
| Database | 240 |
| Output | 241 |
| Output | 243 |
| Output | 244 |
| Program | 245 |
| Screen | 246 |
| Printer | 247 |
| Input | 250 |
| Output | 251 |
| Memory | 252 |
| Memory | 253 |
| Memory | 254 |
| Output | 255 |
| Program module | 256 |
| Program module | 257 |
| Program module | 258 |
| Stress-strain curve generator | 259 |
| Characteristic point | 260 |
| Characteristic point (end point) | 261 |
| Intermediate point | 262 |
| Intermediate point | 263 |
| Intermediate point | 264 |
| Intermediate point | 265 |
| Intermediate point | 266 |
| Intermediate point | 267 |
| Intermediate point | 268 |
| Intermediate point | 269 |
| Stress-strain curve | 280 |
| Stress-strain curve | 281 |
| Characteristic point | 284 |
| Stress-strain curve | 301 |
| Stress-strain curve | 302 |
| Stress-strain curve | 303 |
| Stress-strain curve | 304 |
| Stress-strain curve | 305 |
| Stress-strain curve | 306 |
| Curve | 307 |
| Curve | 308 |
| Curve | 309 |
| Measurement points | 320 |
| Point | 340 |
| Point | 341 |
| Point | 342 |
| Point | 343 |
| Point | 344 |
| Point | 345 |
| Point | 346 |
| Point | 347 |
| Curve | 348 |
| Curve | 349 |
| Curve profile | 360 |
| Curve profile | 361 |
| Curve profile | 362 |
| Curve | 370 |
| Curve | 371 |
| Curve | 372 |
| Diagram | 380 |
| Diagram | 381 |

-continued

| | |
|---|---|
| Diagram | 382 |
| Curve | 383 |
| Curve | 384 |
| Curve | 385 |
| Curve | 386 |
| Curve | 387 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method of determining at least one of mechanical properties and processing properties of an injection-molded part comprising:
(a) providing a hybrid model comprising,
   (i) a first database (12) for storing a relationship between commercial injection molded products and the respective components of the commercial products,
   (ii) a means (1) for inputting recipe parameters of commercial products which specify the composition of the injection-molded part,
   (iii) a means for accessing the first database for the purpose of determining component parameters from the recipe parameters, and
   (iv) at least one neural network for inputting at least one component parameter and for outputting a forecast value;
(b) selecting recipe parameters and component parameters;
(c) inputting recipe and component parameters into said hybrid model; and
(d) obtaining at least one of a forecast and a calculated value of at least one property of said injection-molded part.

2. The method of claim 1 wherein said hybrid model comprises a multiplicity of neural networks ($NN1, \ldots NN_k$) for outputting a corresponding multiplicity of forecast values.

3. The method of claim 1 wherein said hybrid model comprises means for mapping an input vector of parameters ($P1, P2, P3, P4, \ldots P_i$) onto a subvector ($PN1, PN2, PN3, PN4, \ldots PN_j$), and means (4) for mapping the subvector onto corresponding inputs of the neural networks.

4. The method of claim 1 wherein said hybrid model further comprises at least one rigorous model for inputting at least the forecast value and optionally one or more parameters; said rigorous model outputting a calculated value with respect to the properties.

5. The method of claim 1 wherein said hybrid model further comprises a neural network for forecasting a coefficient of static friction from the recipe parameters.

6. The method of claim 1 wherein said hybrid model further comprises a neural network for forecasting the coefficient of sliding friction from the recipe parameters.

7. The method of claim 5 or 6 wherein the coefficients of friction are each independently determined experimentally for the purpose of training the corresponding neural network.

8. The method of claim 1 wherein said hybrid model further comprises a neural network for forecasting the main elements of characteristic points of a stress-strain curve from at least one of the following parameters: recipe, color, geometry of the part, processing conditions and test conditions.

9. The method of claim 8 wherein said hybrid model further comprises: a rigorous model for inverse transformation of the main components of the characteristic points; and a stress-strain curve generator for generating a curve from the inversely transformed main components of the characteristic points.

10. The method of claim 1 wherein said hybrid model further comprises a database (17) for storing characteristic points for direct access to the characteristic points, and having a stress-strain curve generator for generating a curve from the inversely transformed main components of the characteristic points.

11. The method of claim 1 wherein said hybrid model further comprises a rigorous model for determining a relationship between a strain and a stress for an instance of long-term loading.

12. The method of claim 11 wherein the following function is mapped in the rigorous model of the hybrid model:

$$\varepsilon(t, \sigma, T) = \frac{\sigma}{E(T)} + m(\sigma, T)\left(\frac{t}{t_0}\right)^{n(\sigma,T)}$$

where $$m(\sigma) = a_1 \cdot \sinh\frac{\sigma}{\sigma_0 \cdot a_2}$$

and $$n(\sigma) = b_0 + b_1\left(\frac{\sigma}{\sigma_0}\right) + b_2\left(\frac{\sigma}{\sigma_0}\right)^2$$

and where $$\sigma(T,\epsilon)=A_1=A_2=A_3=A_4$$

$$A_1=c_1\epsilon+c_2\epsilon^3+c_3\epsilon^5+c_4 \ln (\epsilon+\sqrt{\epsilon^{2+1}})$$

$$A_2=c_5\epsilon T+c_6\epsilon T^3+c_7\epsilon T^5$$

$$A_3=c_8\epsilon^3 T+c_9\epsilon^3 T^3+c_{10}\epsilon^3 T^5$$

$$A_4=c_{11}\epsilon^5 T+c_{12}\epsilon^5 T^3+c_{13}\epsilon^5 T^5.$$

in the above formulas,
m and n are each independently creepage parameters,
t is time,
$t_0$ is a time unit,
σ is stress,
σ is a stress unit,
E is modulus of elasticity,
T is temperature,
$\epsilon$ is strain,
$a_1$, $a_2$, $b_0$, $b_1$ and $b_3$ are each parameter values that are dependent on temperature and
$c_1$ to $c_{13}$ are coefficients to fit the equation $\sigma(T, \epsilon)=A_1+A_2+A_3+A_4$ to the experimentally determined stress-strain curves.

13. The method of claim 12 wherein said hybrid model further comprises a second database for storing the coefficients $c_1$ to $c_{13}$, and parameter values $a_1$, $a_2$, $b_0$, $b_1$ and $b_2$ for a specific material.

14. A method of determining at least one of mechanical properties and processing properties of an injection-molded part comprising:

(a) providing a hybrid model comprising,
  (i) a first database (12) for storing a relationship between commercial injection molded products and the respective components of the commercial products,
  (ii) a means (1) for inputting recipe parameters of commercial products which specify the composition of the injection-molded part,
  (iii) a means for accessing the first database for the purpose of determining component parameters from the recipe parameters, and
  (iv) at least one neural network for inputting at least one component parameter and for outputting a forecast value;
(b) selecting recipe parameters and component parameters;
(c) inputting recipe and component parameters into said hybrid model; and
(d) obtaining at least one of a forecast and a calculated value of at least one property of said injection-molded part,
wherein said hybrid model further comprises a neural network for forecasting a coefficient of static friction from the recipe parameters.

15. The method of claim 14 wherein said hybrid model further comprises a neural network for forecasting the coefficient of sliding friction from the recipe parameters.

16. The method of claim 14 or 15 wherein the coefficients of friction are each independently determined experimentally for the purpose of training the corresponding neural network.

17. The method of claim 14 wherein said hybrid model further comprises a neural network for forecasting the main elements of characteristic points of a stress-strain curve from at least one of the following parameters: recipe, color, geometry of the part, processing conditions and test conditions.

18. The method of claim 17 wherein said hybrid model further comprises: a rigorous model for inverse transformation of the main components of the characteristic points; and a stress-strain curve generator for generating a curve from the inversely transformed main components of the characteristic points.

19. The method of claim 14 wherein said hybrid model further comprises a database (17) for storing characteristic points for direct access to the characteristic points, and having a stress-strain curve generator for generating a curve from the inversely transformed main components of the characteristic points.

20. The method of claim 14 wherein said hybrid model further comprises a rigorous model for determining a relationship between a strain and a stress for an instance of long-term loading.

21. The method of claim 20 wherein the following function is mapped in the rigorous model of the hybrid model:

$$\varepsilon(t, \sigma, T) = \frac{\sigma}{E(T)} + m(\sigma, T)\left(\frac{t}{t_0}\right)^{n(\sigma,T)}$$

where $$m(\sigma) = a_1 \cdot \sinh\frac{\sigma}{\sigma_0 \cdot a_2}$$

and $$n(\sigma) = b_0 + b_1\left(\frac{\sigma}{\sigma_0}\right) + b_2\left(\frac{\sigma}{\sigma_0}\right)^2$$

and where $$\sigma(T, \epsilon) = A_1 + A_2 + A_3 + A_4$$

$$A_1 = c_1\epsilon + c_2\epsilon^3 + c_3\epsilon^5 + c_4 \ln(\epsilon + \sqrt{\epsilon^2 + 1})$$

$$A_2 = c_5\epsilon T + c_6\epsilon T^3 + c_7\epsilon T^5$$

$$A_3 = c_8\epsilon^3 T + c_9\epsilon^3 T^3 + c_{10}\epsilon^3 T^5$$

$$A_4 = c_{11}\epsilon^5 T + c_{12}\epsilon^5 T^3 + c_{13}\epsilon^5 T^5.$$

in the above formulas, m and n are each independently creepage parameters, t is time, $t_0$ is a time unit, σ is stress, $\sigma$ is a stress unit, E is modulus of elasticity, T is temperature, ε is strain, $a_1, a_2, b_0, b_1$ and $b_3$ are each parameter values that are dependent on temperature and $c_1$ to $c_{13}$ are coefficients to fit the equation $\sigma(T, \epsilon) = A_1 + A_2 + A_3 + A_4$ to the experimentally determined stress-strain curves.

22. The method of claim 21 wherein said hybrid model further comprises a second database for storing the coefficients $c_1$ to $c_{13}$, and parameter values $a_1, a_2, b_0, b_1$ and $b_2$ for a specific material.

* * * * *

UNITED STATES PATENT AND TRADEMARK OFFICE
CERTIFICATE OF CORRECTION

PATENT NO. : 6,839,608 B2
DATED : January 4, 2005
INVENTOR(S) : Bahman Sarabi et al.

It is certified that error appears in the above-identified patent and that said Letters Patent is hereby corrected as shown below:

Column 17,
Line 20, delete equation (2) and insert the following:

$$-- A_1 = c_1 \varepsilon + c_2 \varepsilon^3 + c_3 \varepsilon^5 + c_4 \ln\left(\varepsilon + \sqrt{\varepsilon^2 + 1}\right) \quad (2) \quad --$$

Column 24,
Line 35, after "and where" delete the first and second equations and insert the following:

$$-- \sigma(T,\varepsilon) = A_1 + A_2 + A_3 + A_4$$

$$A_1 = c_1 \varepsilon + c_2 \varepsilon^3 + c_3 \varepsilon^5 + c_4 \ln\left(\varepsilon + \sqrt{\varepsilon^2 + 1}\right) --$$

Column 26,
Line 20, after "and where" delete the second equation and insert the following:

$$-- A_1 = c_1 \varepsilon + c_2 \varepsilon^3 + c_3 \varepsilon^5 + c_4 \ln\left(\varepsilon + \sqrt{\varepsilon^2 + 1}\right) --$$

Line 38, replace "εis strain" with -- ε is strain --.

Signed and Sealed this

Seventeenth Day of May, 2005

JON W. DUDAS
*Director of the United States Patent and Trademark Office*